United States Patent
Mason

(10) Patent No.: US 9,471,192 B2
(45) Date of Patent: Oct. 18, 2016

(54) REGION DYNAMICS FOR DIGITAL WHITEBOARD

(71) Applicant: Haworth, Inc., Holland, MI (US)

(72) Inventor: Steve Mason, San Francisco, CA (US)

(73) Assignee: HAWORTH, INC., Holland, MI (US)

( * ) Notice: Subject to any disclaimer, the term of this patent is extended or adjusted under 35 U.S.C. 154(b) by 357 days.

(21) Appl. No.: 13/758,984

(22) Filed: Feb. 4, 2013

(65) Prior Publication Data

US 2013/0346910 A1  Dec. 26, 2013

Related U.S. Application Data

(63) Continuation-in-part of application No. 13/478,994, filed on May 23, 2012, and a continuation-in-part of application No. PCT/US2012/039176, filed on May 23, 2012, now Pat. No. 9,430,140.

(60) Provisional application No. 61/697,248, filed on Sep. 5, 2012, provisional application No. 61/489,238, filed on May 23, 2011.

(51) Int. Cl.
*G06F 3/048* (2013.01)
*G06F 3/0488* (2013.01)
*G06F 9/44* (2006.01)

(52) U.S. Cl.
CPC .......... *G06F 3/048* (2013.01); *G06F 3/04883* (2013.01); *G06F 9/4443* (2013.01); *G06F 2203/0383* (2013.01)

(58) Field of Classification Search
CPC ..... G06F 3/0484; G06F 3/0488; G06F 3/041
USPC .................................................. 715/753, 751
See application file for complete search history.

(56) References Cited

U.S. PATENT DOCUMENTS

| 4,686,332 A | 8/1987 | Greanias et al. |
|---|---|---|
| 5,008,853 A | 4/1991 | Bly et al. |
| 5,220,657 A | 6/1993 | Bly et al. |

(Continued)

FOREIGN PATENT DOCUMENTS

| CN | 101630240 A | 1/2010 |
|---|---|---|
| JP | 2010079834 A | 4/2010 |

(Continued)

OTHER PUBLICATIONS

PCT/US2013/058249—International Search Report and Written Opinion mailed Dec. 18, 2013, 14 pages.

(Continued)

*Primary Examiner* — Jeffrey A Gaffin
*Assistant Examiner* — Sabrina Greene
(74) *Attorney, Agent, or Firm* — Haynes Beffel & Wolfeld LLP

(57) ABSTRACT

Roughly described, different drawing regions are opened for different users on the same whiteboard. Each drawing region has its own set of line appearance properties, which the user can set with a toolbar. Lines drawn in a drawing region adopt the line appearance properties then in effect for that drawing region, which also apply to replications of the line on other devices in the collaboration session. As the user draws toward a boundary of the user's drawing region, the boundary automatically moves so that the drawing continues to contain the user's drawing activity.

19 Claims, 17 Drawing Sheets

(56) References Cited

U.S. PATENT DOCUMENTS

| | | | |
|---|---|---|---|
| 5,309,555 A | 5/1994 | Akins et al. | |
| 5,446,842 A | 8/1995 | Schaeffer et al. | |
| 5,537,526 A | 7/1996 | Anderson et al. | |
| 5,727,002 A | 3/1998 | Miller et al. | |
| 5,781,732 A | 7/1998 | Adams | |
| 5,818,425 A | 10/1998 | Want et al. | |
| 5,835,713 A | 11/1998 | FitzPatrick et al. | |
| 5,872,924 A | 2/1999 | Nakayama et al. | |
| 5,938,724 A | 8/1999 | Pommier et al. | |
| 5,940,082 A | 8/1999 | Brinegar et al. | |
| 6,084,584 A | 7/2000 | Nahi et al. | |
| 6,128,014 A | 10/2000 | Nakagawa et al. | |
| 6,167,433 A | 12/2000 | Maples et al. | |
| 6,320,597 B1 | 11/2001 | Ieperen | |
| 6,342,906 B1 | 1/2002 | Kumar et al. | |
| 6,343,313 B1 | 1/2002 | Salesky et al. | |
| 6,518,957 B1 | 2/2003 | Lehtinen et al. | |
| 6,564,246 B1 | 5/2003 | Varma et al. | |
| 6,911,987 B1 | 6/2005 | Mairs et al. | |
| 6,930,673 B2 | 8/2005 | Kaye et al. | |
| 6,930,679 B2 | 8/2005 | Wu et al. | |
| 7,003,728 B2 | 2/2006 | Berque | |
| 7,043,529 B1 | 5/2006 | Simonoff | |
| 7,129,934 B2 | 10/2006 | Luman et al. | |
| 7,171,448 B1 | 1/2007 | Danielsen et al. | |
| 7,356,563 B1 | 4/2008 | Leichtling et al. | |
| 7,450,109 B2 * | 11/2008 | Halcrow et al. | 345/173 |
| D600,703 S | 9/2009 | LaManna et al. | |
| 8,209,308 B2 | 6/2012 | Rueben et al. | |
| D664,562 S | 7/2012 | McCain et al. | |
| 8,402,391 B1 | 3/2013 | Doray et al. | |
| 8,898,590 B2 | 11/2014 | Okada et al. | |
| 2003/0020671 A1 | 1/2003 | Santoro et al. | |
| 2003/0058227 A1 | 3/2003 | Hara et al. | |
| 2004/0060037 A1 | 3/2004 | Damm et al. | |
| 2004/0150627 A1 | 8/2004 | Luman et al. | |
| 2004/0155871 A1 | 8/2004 | Perski et al. | |
| 2004/0174398 A1 | 9/2004 | Luke et al. | |
| 2005/0060656 A1 | 3/2005 | Martinez et al. | |
| 2005/0195216 A1 * | 9/2005 | Kramer et al. | 345/619 |
| 2005/0237380 A1 | 10/2005 | Kakii et al. | |
| 2005/0273700 A1 | 12/2005 | Champion et al. | |
| 2006/0012580 A1 | 1/2006 | Perski et al. | |
| 2006/0066588 A1 | 3/2006 | Lyon et al. | |
| 2006/0195507 A1 | 8/2006 | Baek et al. | |
| 2006/0211404 A1 | 9/2006 | Cromp et al. | |
| 2006/0220982 A1 | 10/2006 | Ueda | |
| 2006/0224427 A1 | 10/2006 | Salmon | |
| 2007/0262964 A1 | 11/2007 | Zotov et al. | |
| 2008/0143818 A1 | 6/2008 | Ferren et al. | |
| 2008/0163053 A1 | 7/2008 | Hwang et al. | |
| 2008/0177771 A1 | 7/2008 | Vaughn | |
| 2008/0207188 A1 | 8/2008 | Ahn et al. | |
| 2009/0049381 A1 | 2/2009 | Robertson et al. | |
| 2009/0089682 A1 | 4/2009 | Baier et al. | |
| 2009/0128516 A1 | 5/2009 | Rimon et al. | |
| 2009/0153519 A1 | 6/2009 | Suarez Rovere | |
| 2009/0160786 A1 | 6/2009 | Finnegan | |
| 2009/0174679 A1 | 7/2009 | Westerman | |
| 2009/0195518 A1 | 8/2009 | Mattice et al. | |
| 2009/0207146 A1 | 8/2009 | Shimasaki et al. | |
| 2009/0251457 A1 | 10/2009 | Walker et al. | |
| 2009/0278806 A1 | 11/2009 | Duarte et al. | |
| 2009/0282359 A1 | 11/2009 | Saul et al. | |
| 2009/0309846 A1 | 12/2009 | Trachtenberg et al. | |
| 2009/0309853 A1 | 12/2009 | Hildebrandt et al. | |
| 2010/0017727 A1 | 1/2010 | Offer et al. | |
| 2010/0073454 A1 | 3/2010 | Lovhaugen et al. | |
| 2010/0132034 A1 | 5/2010 | Pearce et al. | |
| 2010/0205190 A1 | 8/2010 | Morris et al. | |
| 2010/0211920 A1 | 8/2010 | Westerman et al. | |
| 2010/0306650 A1 | 12/2010 | Oh et al. | |
| 2010/0306696 A1 | 12/2010 | Groth et al. | |
| 2010/0309148 A1 | 12/2010 | Fleizach et al. | |
| 2010/0315481 A1 | 12/2010 | Wijngaarden et al. | |
| 2010/0318470 A1 | 12/2010 | Meinel et al. | |
| 2010/0318921 A1 | 12/2010 | Trachtenberg et al. | |
| 2010/0328306 A1 | 12/2010 | Chau et al. | |
| 2011/0050640 A1 | 3/2011 | Lundback et al. | |
| 2011/0069184 A1 | 3/2011 | Go | |
| 2011/0109526 A1 | 5/2011 | Bauza et al. | |
| 2011/0148926 A1 | 6/2011 | Koo et al. | |
| 2011/0154192 A1 | 6/2011 | Yang et al. | |
| 2011/0183654 A1 | 7/2011 | Lanier et al. | |
| 2011/0197147 A1 | 8/2011 | Fai | |
| 2011/0197157 A1 | 8/2011 | Hoffman et al. | |
| 2011/0202424 A1 | 8/2011 | Chun et al. | |
| 2011/0208807 A1 | 8/2011 | Shaffer | |
| 2011/0214063 A1 | 9/2011 | Saul | |
| 2011/0216064 A1 | 9/2011 | Dahl et al. | |
| 2011/0225494 A1 | 9/2011 | Shmuylovich et al. | |
| 2011/0246875 A1 | 10/2011 | Parker et al. | |
| 2011/0264785 A1 | 10/2011 | Newman et al. | |
| 2011/0271229 A1 | 11/2011 | Yu | |
| 2012/0011465 A1 | 1/2012 | Rezende | |
| 2012/0019452 A1 | 1/2012 | Westerman | |
| 2012/0026200 A1 | 2/2012 | Okada et al. | |
| 2012/0030193 A1 | 2/2012 | Richberg et al. | |
| 2012/0038572 A1 | 2/2012 | Kim et al. | |
| 2012/0050197 A1 | 3/2012 | Kemmochi | |
| 2012/0075212 A1 | 3/2012 | Park et al. | |
| 2012/0124124 A1 | 5/2012 | Beaty et al. | |
| 2012/0127126 A1 | 5/2012 | Mattice et al. | |
| 2012/0176328 A1 | 7/2012 | Brown et al. | |
| 2012/0229425 A1 | 9/2012 | Barrus et al. | |
| 2012/0254858 A1 | 10/2012 | Moyers et al. | |
| 2012/0260176 A1 | 10/2012 | Sehrer | |
| 2012/0274583 A1 | 11/2012 | Haggerty | |
| 2012/0278738 A1 | 11/2012 | Kruse et al. | |
| 2012/0320073 A1 | 12/2012 | Mason | |
| 2013/0004069 A1 | 1/2013 | Hawkins et al. | |
| 2013/0047093 A1 | 2/2013 | Reuschel et al. | |
| 2013/0218998 A1 | 8/2013 | Fischer et al. | |
| 2013/0320073 A1 | 12/2013 | Yokoo et al. | |
| 2013/0346878 A1 | 12/2013 | Mason | |
| 2014/0022334 A1 | 1/2014 | Lockhart et al. | |
| 2014/0033067 A1 | 1/2014 | Pittenger et al. | |
| 2014/0055400 A1 | 2/2014 | Reuschel | |
| 2014/0062957 A1 | 3/2014 | Perski et al. | |
| 2014/0222916 A1 | 8/2014 | Foley et al. | |
| 2014/0223334 A1 | 8/2014 | Jensen et al. | |
| 2014/0223335 A1 | 8/2014 | Pearson | |
| 2015/0084055 A1 | 3/2015 | Nagata et al. | |

FOREIGN PATENT DOCUMENTS

| | | |
|---|---|---|
| JP | 2010134897 A | 6/2010 |
| JP | 2012043251 A | 3/2012 |
| WO | 0161633 A2 | 8/2001 |
| WO | 2009018314 A2 | 2/2009 |
| WO | 2011/029067 A2 | 3/2011 |
| WO | 2011048901 A1 | 4/2011 |
| WO | 2012/162411 A1 | 11/2012 |

OTHER PUBLICATIONS

PCT/US2013/058040—International Search Report and Written Opinion mailed Dec. 18, 2013, 10 pages.

PCT/US2014/014489—International Search Report and Written Opinion dated May 30, 2014, 13 pages.

PCT/US2014/014494—International Search Report and Written Opinion dated May 30, 2014, 10 pages.

PCT/US2014/018375—International Search Report and Written Opinion mailed Jul. 1, 2014, 16 pages.

Keller, A., Masters Thesis: "The ANA Project, Development of the ANA-Core Software," Sep. 21, 2007, ETH Zurich, 92 pages.

Anacore, "Anacore Presents Synthesis", InfoComm 2012: Las Vegas, NV, USA, Jun. 9-15, 2012, 2 pages, Screen shots taken from http://www.youtube.com/watch?v=FbQ9Plc5aHk (visited Nov. 1, 2013).

PCT/US2012/39176—International Search Report and Written Opinion mailed Sep. 24, 2012, 21 pages.

(56) References Cited

OTHER PUBLICATIONS

PCT/US2013/058261—International Search Report and Written Opinion mailed Dec. 30, 2013, 14 pages.
PCT/US2013/058030—International Search Report and Written Opinion mailed Dec. 27, 2013, 11 pages.
Extended EP Search Report in Application No. 13834996.4 dated Mar. 29, 2016, 11 pages.
U.S. Appl. No. 13/758,993, filed Feb. 4, 2013, entitled "Line Drawing Behavior for Digital Whiteboard," Inventor Steve Mason, 29 pgs.
U.S. Appl. No. 13/758,984—Office Action dated Oct. 8, 2014, 21 pgs.
U.S. Appl. No. 13/759,017—Office Action dated Nov. 6, 2014, 19 pgs.
PCT/US2014/014475—International Search Report and Written Opinion dated Nov. 28, 2014, 10 pgs.
U.S. Appl. No. 13/758,993—Office Action dated Feb. 3, 2015, 22 pgs.
Villamor, C., et al., "Touch Gesture Reference Guide", Apr. 15, 2010, retrieved from the internet: http://web.archive.org/web/20100601214053; http://www.lukew.com/touch/TouchGestureGuide.pdf, 7 pages, retrieved on Apr. 10, 2012.
U.S. Appl. No. 14/018,370—Office Action dated May 21, 2015, 51 pages.
EP 12789695.9—Supplemental European Search Report dated Nov. 19, 2014, 9 pgs.
U.S. Appl. No. 13/478,994—Office Action dated Jul. 8, 2015, 12 pgs.
U.S. Appl. No. 13/478,994—Office Action dated Sep. 29, 2014, 10 pgs.
U.S. Appl. No. 13/478,994—Office Action dated Dec. 9, 2013, 7 pgs.
Albin, T., "Comfortable Portable Computing: The Ergonomic Equation," Copyright 2008 Ergotron, Inc., 19 pgs.
"Ergonomics Data and Mounting Heights," Ergonomic Ground Rules, last revised Sep. 22, 2010, 2 pgs.
U.S. Appl. No. 13/758,984—Office Action dated Jun. 19, 2015, 25 pgs.
U.S. Appl. No. 13/759,017—Office Action dated Jun. 19, 2015, 27 pgs.
U.S. Appl. No. 13/758,993—Office Action dated Jul. 30, 2015, 43 pgs.
U.S. Appl. No. 13/759,018—Office Action dated Oct. 22, 2014, 16 pgs.
U.S. Appl. No. 13/759,018—Office Action dated Apr. 23, 2015, 24 pgs.
U.S. Appl. No. 13/759,018—Office Action dated Aug. 27, 2015, 22 pgs.
U.S. Appl. No. 13/758,984—Office Action dated Feb. 13, 2015, 22 pgs.

* cited by examiner

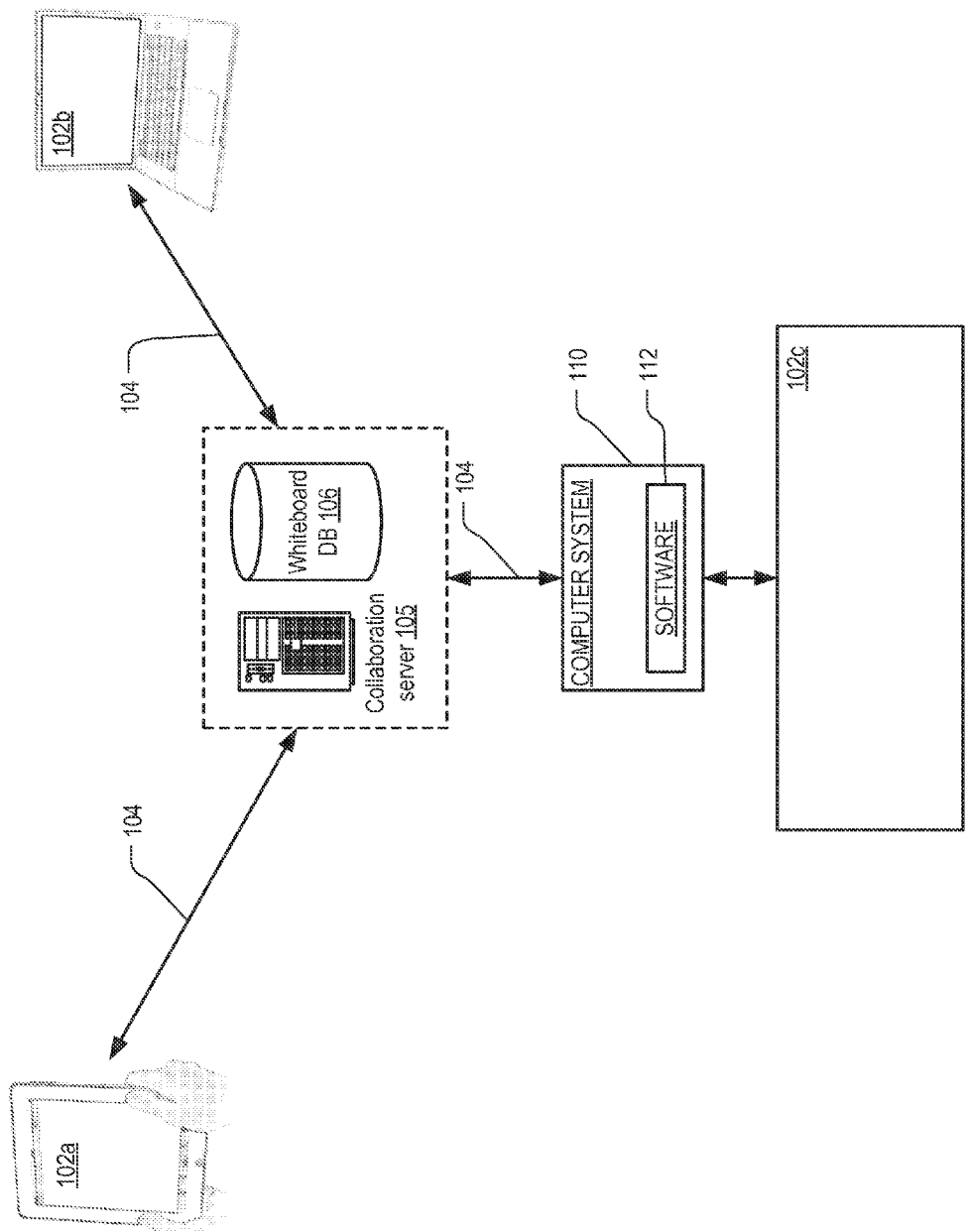

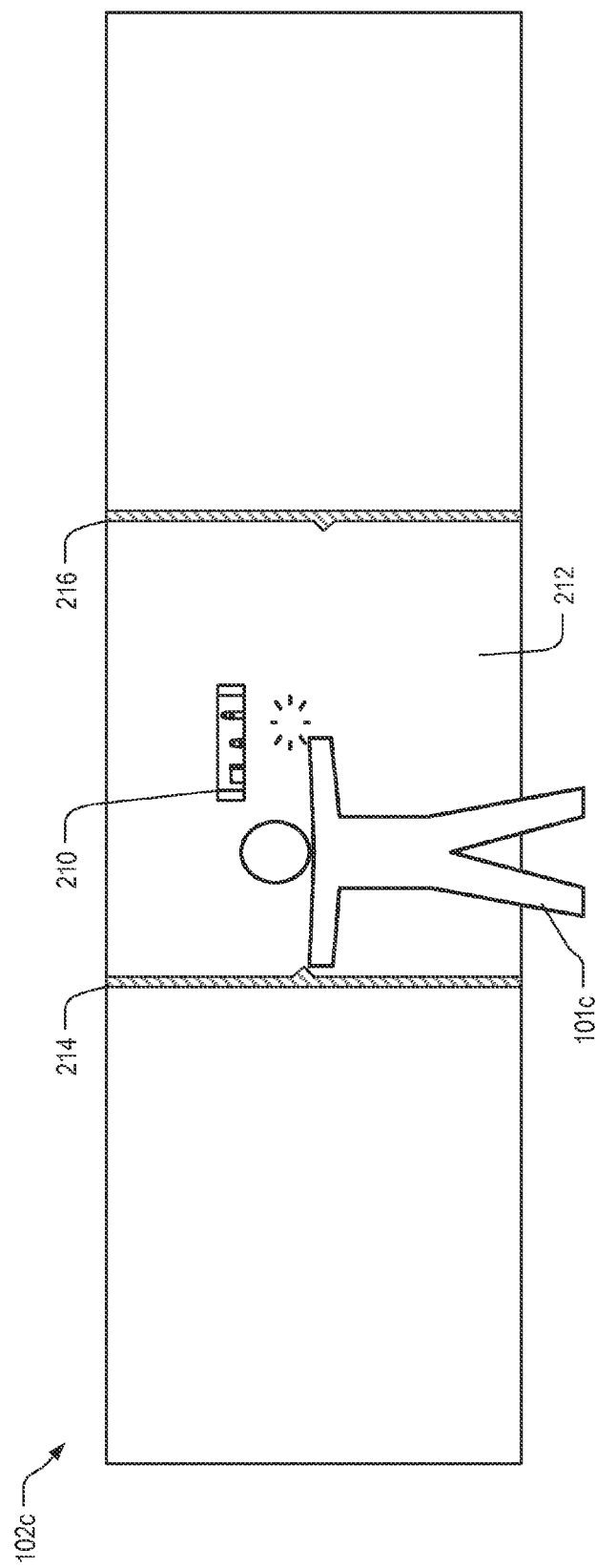

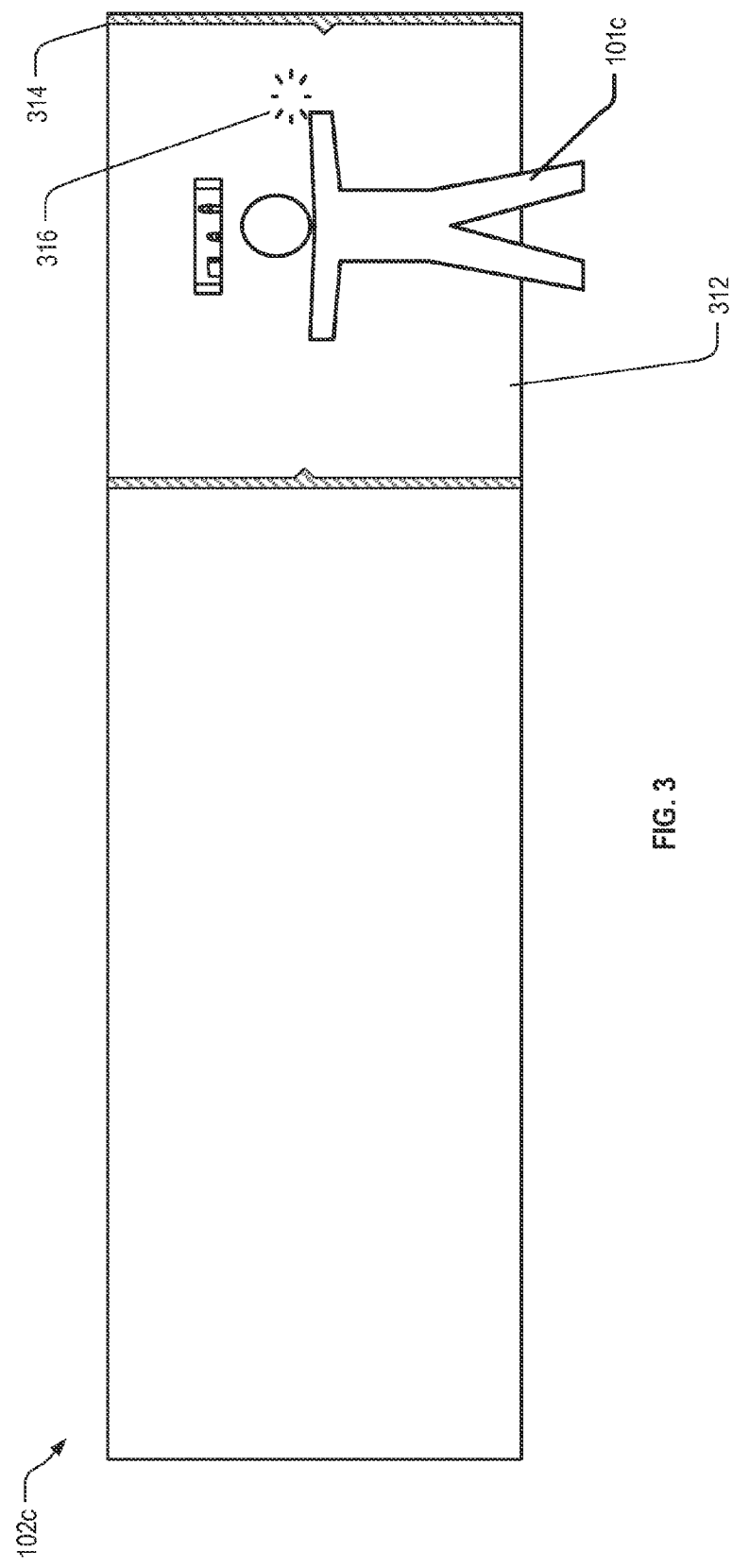

REGION DYNAMICS FOR DIGITAL WHITEBOARD

CROSS-REFERENCE TO OTHER APPLICATIONS

Applicants hereby claim the benefit under 35 U.S.C. 119 of U.S. provisional application No. 61/697,248 filed Sep. 5, 2012.

This application is also a continuation-in-part of U.S. application Ser. No. 13/478,994 filed May 23, 2012, which in turn claims priority under 35 USC §119 to U.S. provisional patent application Ser. No. 61/489,238 filed May 23, 2011.

This application is also a continuation-in-part of PCT International Application No. PCT/US12/39176, filed May 23, 2012, which claims priority from Provisional Application No. 61/489,238, filed May 23, 2011.

All of the above applications are incorporated by reference herein.

The following applications are also incorporated by reference:

PCT International Publication No. WO 2011/029067, published on 10 Mar. 2011;

U.S. application Ser. No. 13/759,017 entitled "Collaboration System with Whiteboard Access to Global Collaboration Data", by inventor Aaron Jensen, filed 4 Feb. 2013; and U.S. application Ser. No. 13/759,984 entitled "Collaboration System with Whiteboard with Federated Display", by inventor Adam Pearson, filed 4 Feb. 2013.

STATEMENT CONCERNING JOINT RESEARCH AGREEMENT

Haworth, Inc., a Michigan corporation, Thought Stream LLC, a Delaware corporation, and Obscura Digital Incorporated, a California corporation, are parties to a Joint Research Agreement.

BACKGROUND

The invention relates to apparatuses, methods, and systems for digital collaboration, and more particularly to digital whiteboard systems which facilitate multiple simultaneous users.

Digital whiteboards are often used for interactive presentations and other purposes. Some whiteboards are networked and can be used for collaboration, so that modifications made to the display image on one whiteboard are replicated on another whiteboard or display. Large scale whiteboards offer the opportunity for more than one user to present or annotate simultaneously on the same surface. However, problems can occur in the coordination of the multiple users, and in some circumstances their use of a single whiteboard can restrict their flexibility of expression.

Therefore, it would be desirable to find ways to allow multiple users to share a common whiteboard surface, in such a way that each user has maximum freedom to express his or her ideas. An opportunity therefore arises to create robust solutions to the problem. Better ideas, collaboration and results may be achieved.

SUMMARY

Roughly described, the invention involves opening different drawing regions for different users on the same whiteboard. Each drawing region has its own set of line appearance properties, which the user can set with a toolbar. Lines drawn in a drawing region adopt the line appearance properties then in effect for that drawing region, which also apply to replications of the line on other devices in the collaboration session. As the user draws toward a boundary of the user's drawing region, the boundary automatically moves so that the drawing continues to contain the user's drawing activity.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, which are not drawn to scale, and in which:

FIGS. 1A and 1B (collectively FIG. 1) illustrate example aspects of a digital whiteboard collaboration environment incorporating features of the invention.

FIGS. 2, 3, 4, 5, 6, 7, 8A, 8B (collectively FIG. 8) and 9 illustrate aspects of drawing region behavior on the whiteboard of FIG. 1.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1A:
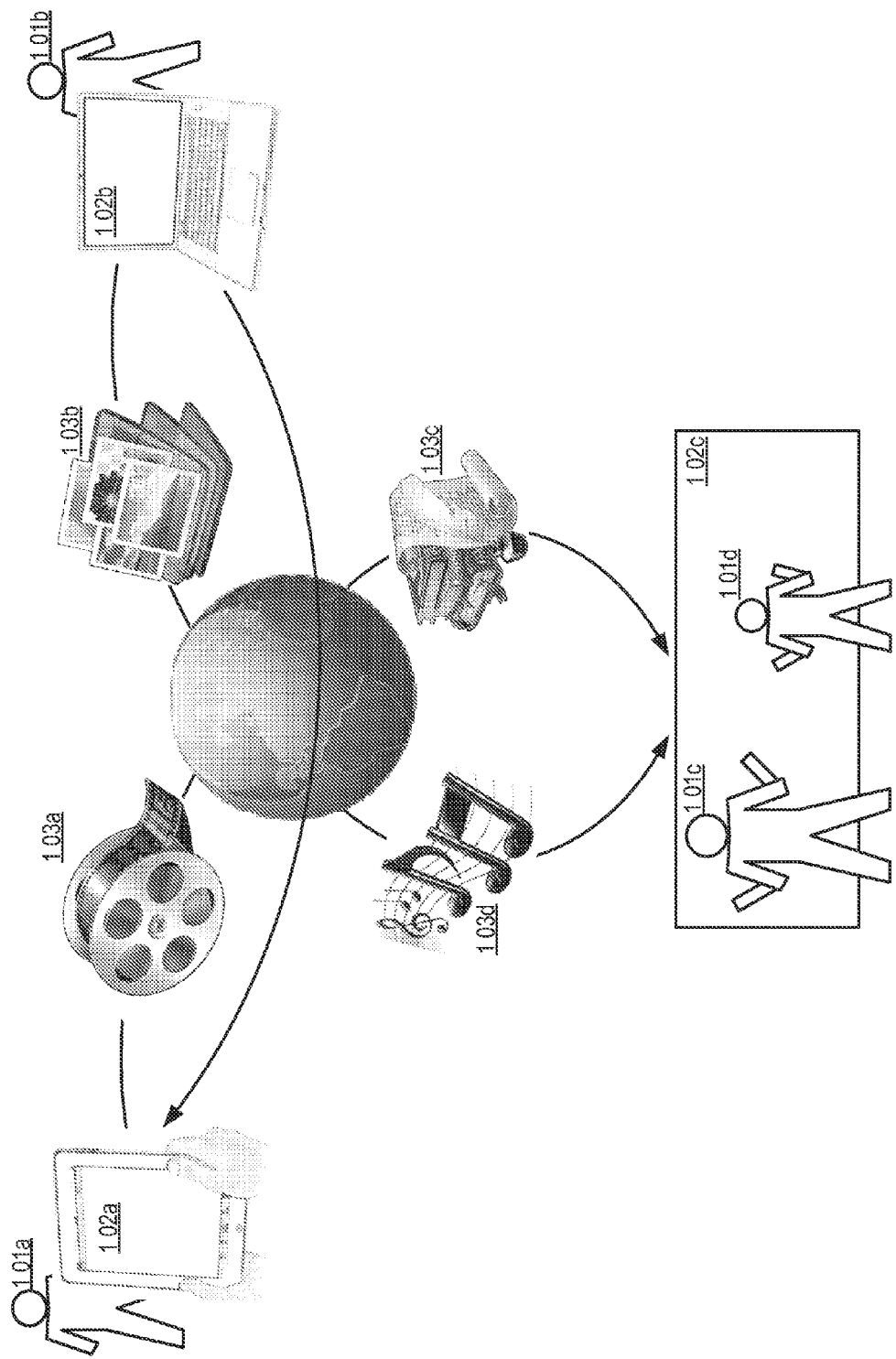

FIG. 1A illustrates example aspects of a digital whiteboard collaboration environment incorporating features of the invention. In the example, a plurality of users 101a-d (collectively 101), may desire to collaborate with each other in the creation of complex images, music, video, documents, and/or other media, all generally designated in FIG. 1A as 103a-d (collectively 103). The users in the illustrated example use a variety of devices in order to collaborate with each other, for example a tablet 102a, a personal computer (PC) 102b, and a large format whiteboard 102c (collectively devices 102). In the illustrated example the large format whiteboard 102c, which is sometimes referred to herein as a "wall", accommodates more than one of the users, in this case users 101c and 101d.

FIG. 1B illustrates the same environment as FIG. 1A. As shown in FIG. 1B, the large format whiteboard 102c, sometimes referred to herein as a "wall", is controlled by a computer system 110, which in turn is in network communication with a central collaboration server 105, which has accessible thereto a database 106. As used herein, the term "database" does not necessarily imply any unity of structure. For example, two or more separate databases, when considered together, still constitute a "database" as that term is used herein. The database 106 stores, for example, a digital representation of a whiteboard canvas. The canvas has unlimited or virtually unlimited dimensions, and each device 102 displays only a portion of the overall canvas. Preferably the canvas is as large as needed, subject only to memory storage and addressing limitations. The server 105 stores session data for a plurality of collaboration sessions, and provides the session data to the whiteboards participating in the session. The session data is then used by the devices to determine images to display, and to assign objects for interaction to locations on the display surface of the whiteboard. In some alternatives, the server 105 can keep track of a "viewport" for each device 102, indicating the portion of the canvas viewable on that device, and can provide to each device 102 data needed to render the viewport.

The user interface data stored in database 106 includes various types of objects, such as image bitmaps, video objects, multi-page documents, scalable vector graphics, and the like. The devices 102 are each in communication with the collaboration server 105 via a network 104. The network 104 can include all forms of networking components, such as LANs, WANs, routers, switches, WiFi components, cellular components, wired and optical components, and the internet. In one scenario two or more of the users 101 are located in the same room, and their devices 102 communicate via WiFi with the collaboration server 105. In another scenario two or more of the users 101 are separated from each other by thousands of miles and their devices 102 communicate with the collaboration server 105 via the internet. Note that whereas a collaborative environment as illustrated in FIG. 1 is most advantageous, many of the drawing region boundary features and moving toolbar features described herein can also be used on a standalone whiteboard 102c.

The wall 102c is a multi-touch device which not only displays an image, but also can sense user gestures provided by touching the display surface with either a stylus or a part of the body such as one or more fingers. The wall 102c can distinguish between a touch by one or more fingers (or an entire hand, for example), and a touch by the stylus. In an embodiment, the wall senses touch by emitting infrared light and detecting light received; light reflected from a user's finger has a characteristic which the wall distinguishes from ambient received light. The stylus emits its own infrared light in a manner that the wall can distinguish from both ambient light and light reflected from a user's finger. The wall 102c may, for example, be an array of Model No. MT553UTBL MultiTaction Cells, manufactured by Multi-Touch Ltd, Helsinki, Finland, tiled both vertically and horizontally. In order to provide a variety of expressive means, the wall 102c is operated in such a way that it maintains "state". That is, it may react to a given input differently depending on (among other things) the sequence of inputs. For example, using a toolbar, a user can select any of a number of available brush styles and colors. Once selected, the wall is in a state in which subsequent strokes by the stylus will draw a line using the selected brush style and color.

In an illustrative embodiment, the array totals on the order of 6' in height and 30' in width, which is wide enough for multiple users to stand at different parts of the wall and manipulate it simultaneously. Flexibility of expression on the wall may be restricted in a multi-user scenario, however, since the wall does not in this embodiment distinguish between fingers of different users, or styli operated by different users. Thus if one user places the wall into one desired state, then a second user would be restricted to use that same state because the wall does not have a way to recognize that the second user's input is to be treated differently.

In order to avoid this restriction, the system defines "drawing regions" on the wall 102c. A drawing region, as used herein, is a region within which at least one aspect of the wall's state can be changed independently of other regions on the wall. In the present embodiment, the aspects of state that can differ among drawing regions are the properties of a line drawn on the wall using a stylus. The response of the system to finger touch behaviors is not affected by drawing regions.

FIG. 2 illustrates a wall 102c. The wall in this example is 6' tall and 30' wide. It is initially a default background color or image, and has a default drawing state throughout the wall. The drawing state is defined by the line drawing properties, which in the embodiment of FIG. 2 include line appearance properties such as brush type, brush size and color. When a user 101c touches the wall, using either a stylus or one or more fingers (sometimes referred to collectively herein as a writing implement), a toolbar 210 appears nearby and a drawing region 212 is defined. Touching a touch point is one embodiment of what is sometimes referred to herein as "opening user input"; other embodiments will be apparent to the reader. The initial drawing state of a newly defined drawing region is a predefined default (such as brush type=ink, thickness=5 mm, color=white), which in various embodiments may or may not match the default state of the remainder of the wall. In the embodiment of FIG. 2 the drawing properties established for a drawing region apply throughout the drawing region. Line drawing operates on the wall logically in a layer above any application program that might be running on the computer system 110, regardless of whether the program has ownership of any particular area of the wall 102c.

In the embodiment of FIG. 2 drawing regions always fill the entire vertical extent of the wall, though in other embodiments regions can be shorter, and/or have non-rectangular shapes. Also in the embodiment of FIG. 2 drawing regions are perceptibly demarcated with left and right hand borders 214 and 216; in another embodiment other means may be used to demarcate the region, such as background shading. In yet another embodiment the region boundaries are not perceptible to the user. Assuming sufficient space to the left and right, the computer system 110 spawns the drawing region in a position that is centered about the user's touch point. Drawing regions have a minimum width Wmin and an ideal width Wideal. The minimum width preferably is chosen to be the smallest width to allow reasonably unfettered expression, and in the embodiment of FIG. 2 is 4'. The ideal width preferably is chosen to be roughly equal to the widest span of an average user's arms stretched out horizontally, and in the embodiment of FIG. 2 is 6'.

Figure 4:
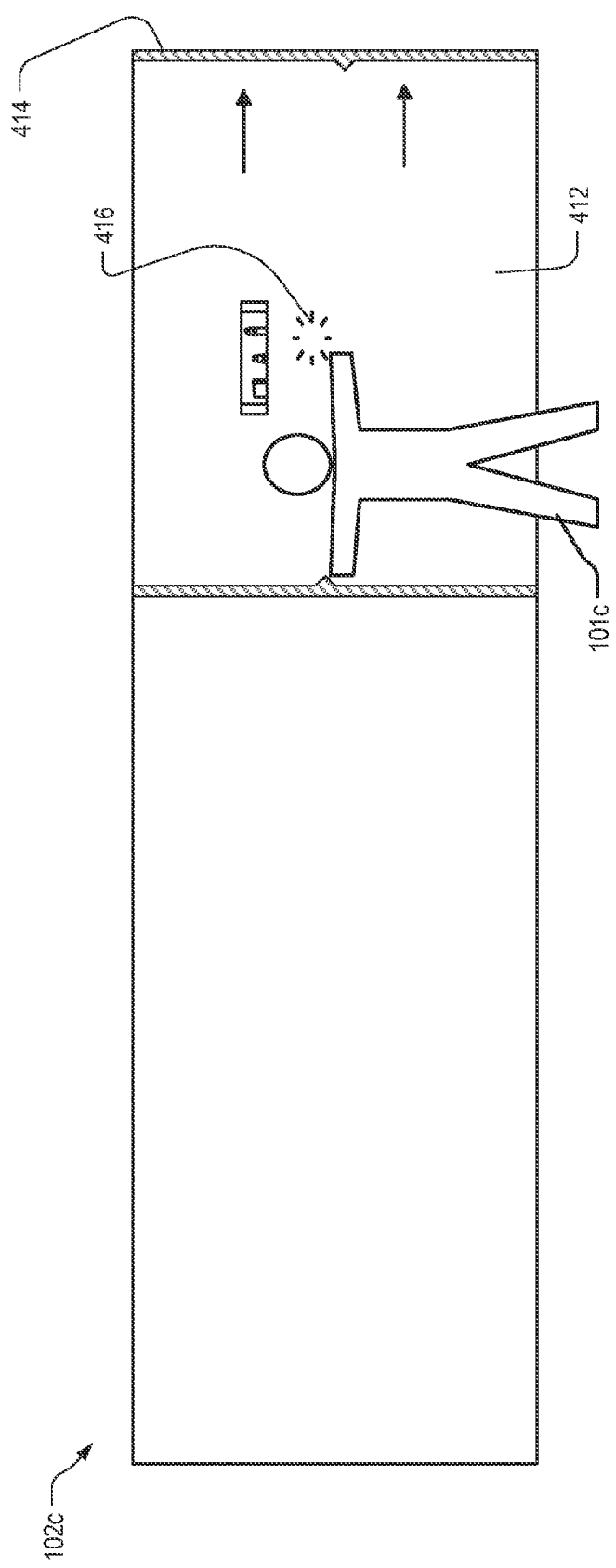

If there is plenty of space on either side of the user's touch point, then the computer system 110 will set the initial region width to Wideal. This is the scenario illustrated in FIG. 2. If the user's touch point is too close to a wall edge for a new drawing region to be centered about it, then the computer system 110 will abut the new drawing region against the wall edge. The new drawing region will still have a width Wideal assuming sufficient space is available, so the new drawing region will not be centered about the user's touch point. This can be seen in FIG. 3, where drawing region 312 is spawned adjacent wall edge 314 in response to the user 101c touching point 316 which, in the illustrated example, is within a distance of less than half Wmin from the edge. On the other hand, if the user's touch point is far enough from the wall edge to create a drawing region centered about the touch point, but the new drawing region would be less than Wmin from the wall edge, then the gap space between the wall edge and the new drawing region is considered unusable. In this case the computer system 110 will extend the new drawing region to fill up the unusable space. This scenario is illustrated in FIG. 4, where drawing region 412 is spawned in response to the user 101c touching point 416 on the wall 102c, and the new drawing region is extended to the nearby wall edge 414. The scenario of FIG. 4 occurs where the touch point is located at a distance D from the edge, where D is between (a) half the ideal width Wideal, and (b) half the ideal width plus the minimum width (that is, where Wideal/2<D<(Wideal/2+Wmin)). Gap filling to an edge may occur in other circumstances as well.

Figure 5:
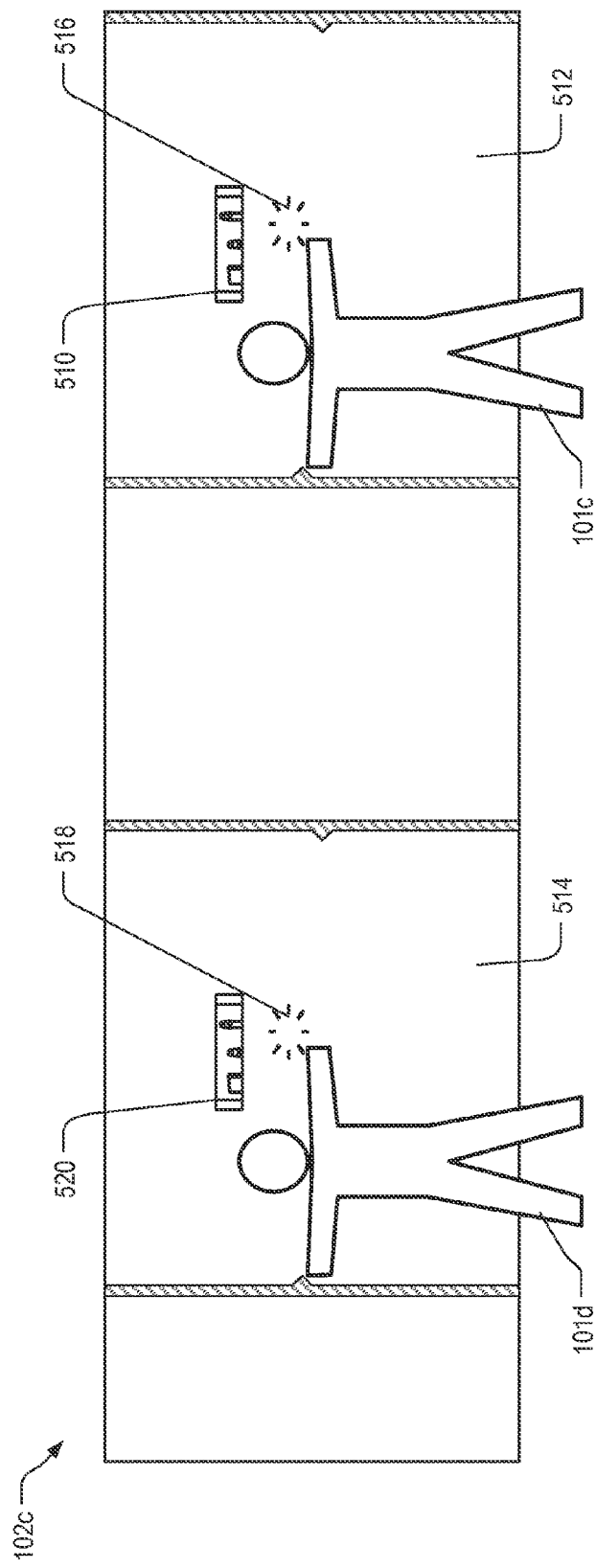

FIG. 5 illustrates a scenario in which two users 101c and 101d can use the wall simultaneously. Initially, user 101c touches the wall 102c at touch point 516, and in response thereto the computer system 110 shawns drawing region 512 with toolbar 510. Optionally, user 101c then touches controls on toolbar 510 in order to change the line appearance properties within region 512. Next, a second user 101d touches the wall 102c at touch point 518, which is within the wall 102c background (i.e. outside of all pre-existing drawing regions). A second drawing region 514 is then spawned by the computer system 110, with toolbar 520. If user 101d draws a line at this time within region 514, the computer system 110 will paint it with the default line properties rather than those previously set by user 101c for drawing region 512. User 101d then optionally touches controls on toolbar 520 in order to change the line appearance properties within region 514. Subsequent lines drawn in region 514 will then adopt the new line appearance properties. The line appearance properties of region 512 will remain unchanged.

Because the wall 102c does not distinguish among different users or styli, the line appearance properties in the embodiments described herein are a function of the drawing region rather than of the user or stylus. Thus if user 101d lifts his or her stylus and begins drawing within drawing region 512, the computer system 110 will draw the line with the properties that user 101c had set for region 512. Similarly, if user 101c lifts his or her stylus and begins drawing within drawing region 514, the computer system 110 will draw the line with the properties that user 101d had set for region 514.

Figure 6:
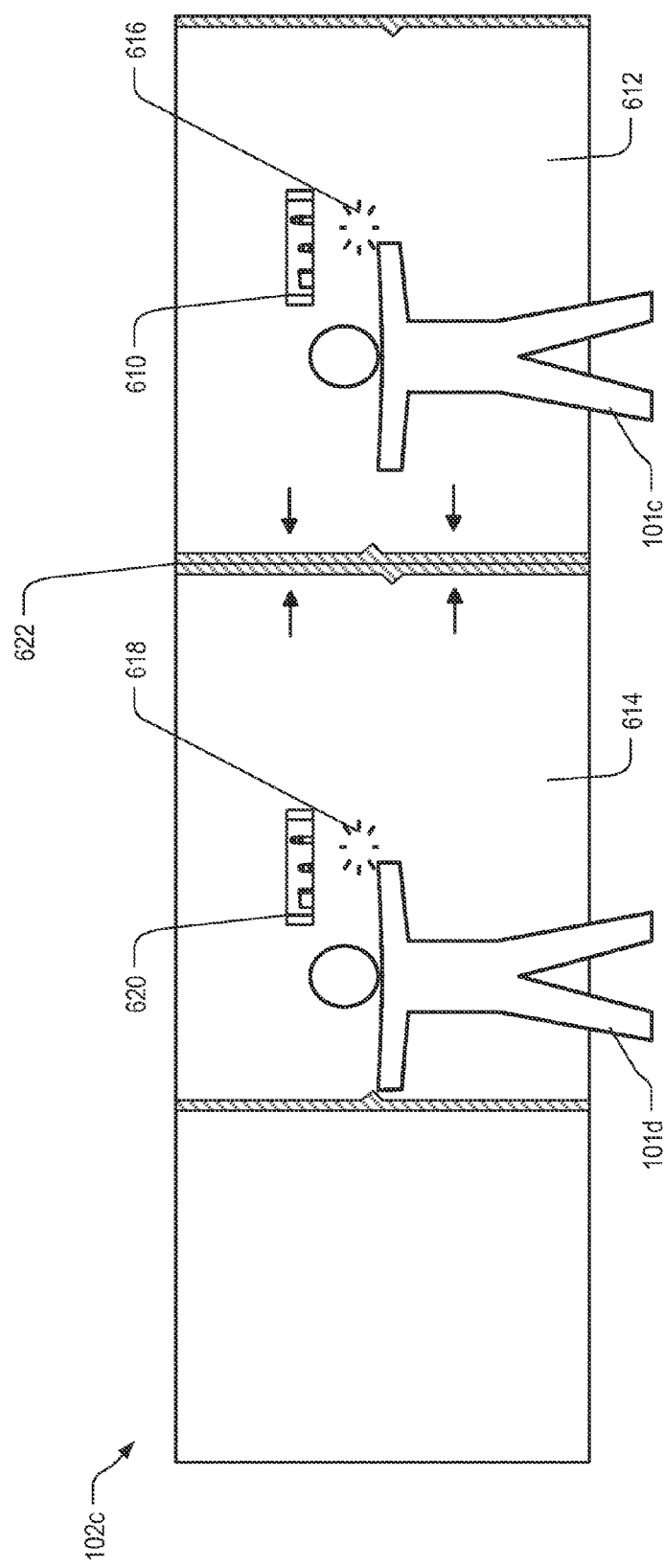

FIG. 6 illustrates a gap-filling feature of wall 102c. Initially, user 101c touches the wall 102c at touch point 616, thereby spawning drawing region 612 with toolbar 610. Optionally, user 101c then touches controls on toolbar 610 in order to change the line appearance properties within region 612. Next, second user 101d touches the wall 102c at touch point 618, thereby spawning drawing region 614 with toolbar 620. There is sufficient space in this scenario for the new drawing region 614 to be centered about the touch point 618, but an edge of the new drawing region 614 would be less than Wmin from the near edge of existing drawing region 612. Then the space between the two drawing regions is considered too narrow to be usable. In this case both drawing regions extend toward each other to meet at a horizontal position 622 between them, preferably splitting the difference between them. As in FIG. 5, the drawing properties of the two drawing regions 612 and 614 can be changed independently.

If in FIG. 6 the second user's touch point 618 is too close to region 612 for new region 614 centered at touch point 618 to extend to width Wideal, then preferably one or the other region 612 or 614 or both will narrow to permit both regions to co-exist on the wall 102c, provided each can retain a width that is at least Wmin. In embodiments described herein, existing region 612 will narrow to accommodate the creation of region 614, and preferably the new region 614 will also be narrower than Wideal, so that in effect both regions become narrower. Also, if the boundary of the new region 614 which is adjacent to the existing region 612 has to be placed at a particular distance closer to the touch point 618 than half of Wideal, then the opposite boundary of new region 614 also is placed at the same particular distance closer to the touch point 618, resulting in a narrowing of new region 614 from both boundaries. As both regions narrow, existing region 612 will not be permitted to reach a width less than Wmin. Instead it will narrow as far as width Wmin and any remaining accommodation will be made in the width of the new region 614, thereby allocating more of the narrowing effect to the new region 614. If the touch point 618 is so close to existing region 612 that the new drawing region 614 cannot be centered about it without violating minimum width Wmin, even after existing region 612 narrows to width Wmin, then the new drawing region 614 will be placed adjacent to existing region 612 as narrowed and will extend away from it for the distance Wmin. As in the scenario of FIG. 3, the new drawing region 614 then will not be centered about the user's touch point 618. If there is insufficient space on wall 102c for the new drawing region to extend for the distance Wmin away from existing region 612 as narrowed, then new region 614 will not be created. This limitation on wall space can arise because the touch point 618 is too near the edge of the wall opposite existing drawing region 612. It can also arise because the touch point 618 is too near another pre-existing drawing region opposite existing drawing region 612, which also cannot narrow sufficiently to accommodate the new drawing region 614.

Figure 7:
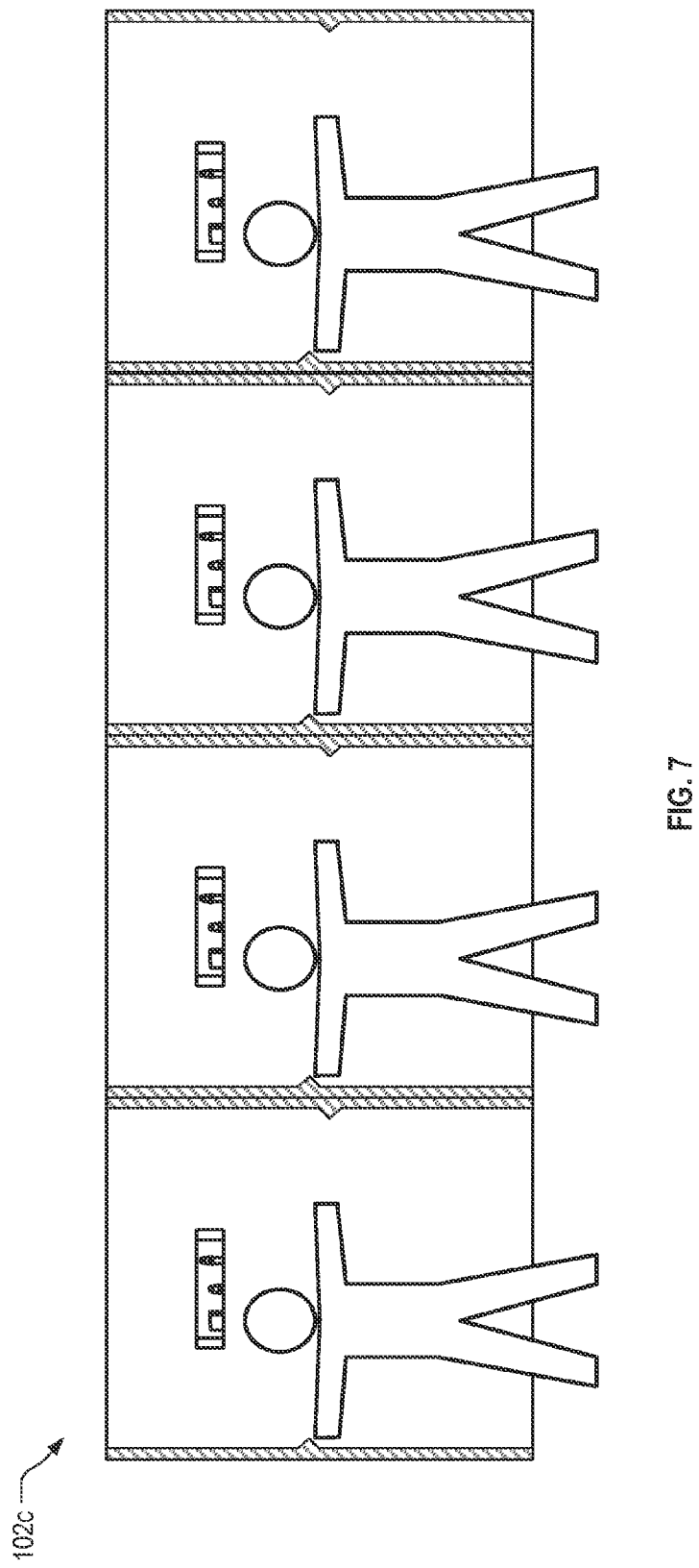

FIG. 7 illustrates a scenario with four users at the wall 102c, each with his or her own drawing region. The maximum number of drawing regions for a given wall is equal to the integer part of Wwall/Wmin, where Wwall is the width of the wall. As regions are introduced, removed and moved around, the region boundaries automatically move in order to fill gaps smaller than Wmin as shown in FIGS. 5 and 6, and open gaps greater than Wmin (not shown) as they arise. Region boundary movement preferably is gradual rather than sudden. Regions can be closed by touching an appropriate icon on the toolbar for the region, and preferably a region will close automatically if there is no interaction within the region within a predetermined timeout period. When a region closes, its toolbar disappears and the boundaries of adjacent regions adjust if they had been narrower than Wideal.

Preferably, drawing regions automatically track the movement of the stylus. Although numerous possible tracking algorithms will be apparent to the reader, one that follows these minimum rules is preferred: (1) the region does not move so long as the stylus remains relatively near the center of the region; and (2) as the stylus approaches a region boundary, the region moves so that the boundary remains ahead of the stylus.

Figure 8:
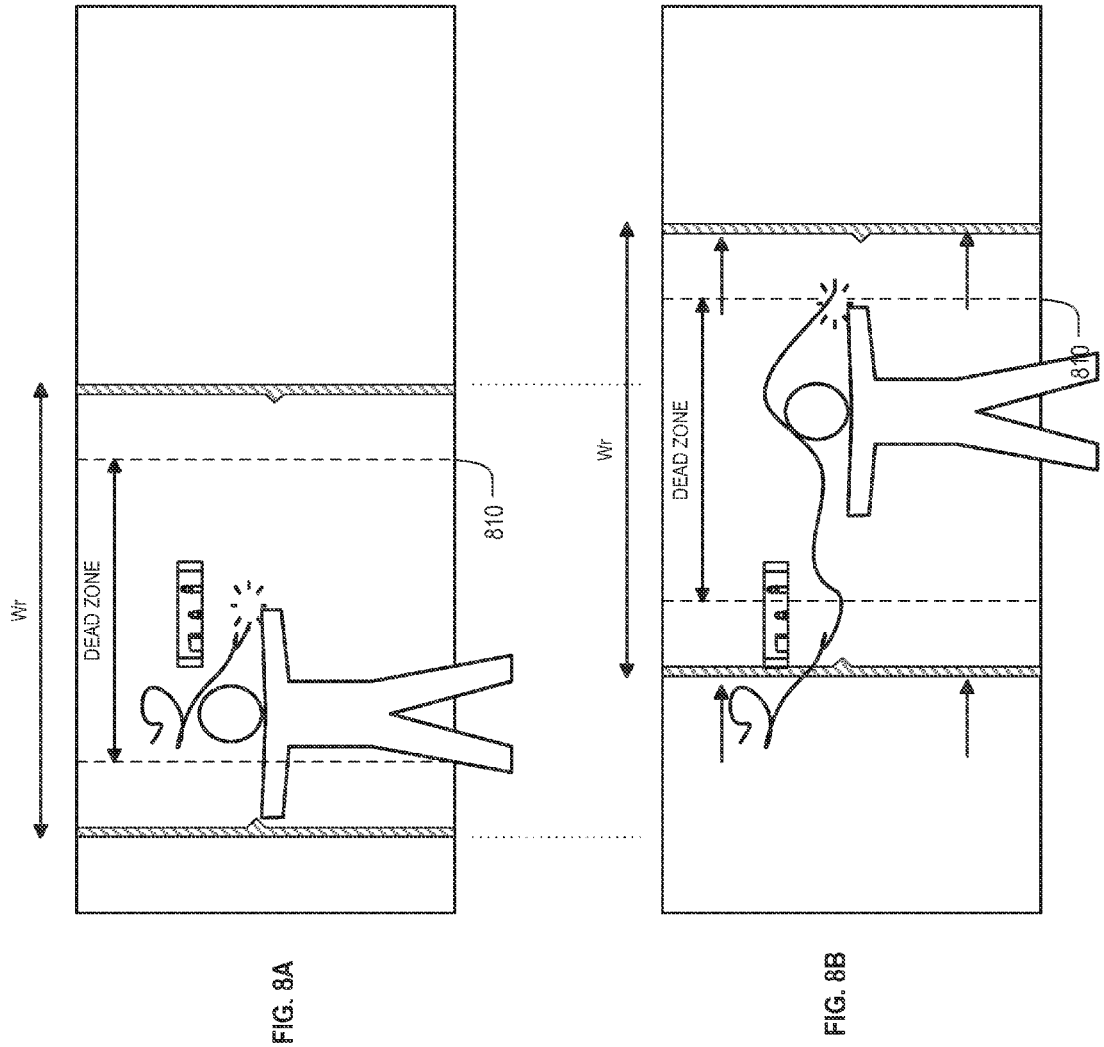

FIGS. 8A and 8B illustrate aspects of a preferred set of tracking algorithms. In FIG. 8A, a user 101c has activated a drawing region 810 on wall 102c. The region 810 currently has a width Wr (6' in FIG. 8A), which is at least as large as Wmin (4' in FIG. 8A). In the example of FIG. 8A, the Wr is also equal to Wideal. A so-called "dead zone" is defined within the region 810, which is centered within the region and has a predefined width Wdz. In the embodiment of FIG. 8A, Wdz=4'. So long as the stylus remains within the dead zone, the region 810 remains stationary. If the stylus reaches the edge of the dead zone, or if user lifts the stylus and puts it down again outside the dead zone, then as illustrated in FIG. 8B the region 810 moves in a direction away from the stylus such that the dead zone continues to contain the stylus position. In one embodiment the region movement is softened with an inertial effect, so that the stylus can actually push past the edge of the dead zone for a short time until the region movement catches up. In the embodiment of FIG. 8, in which drawing regions are always rectangular and boundaries are always vertical, the boundary always moves horizontally. More generally it can be said that the boundary moves in a direction away from the stylus, and perpendicular to the boundary being approached.

As to how close the stylus must be to a region boundary before the region boundary moves, different embodiments can implement different rules. The embodiment of FIG. 8 defines a "dead zone" defined by distance from the center of the drawing region, and any activity outside the dead zone triggers movement of the region boundary. In another embodiment, the proximity to the boundary at which boundary movement is triggered can be defined by distance from the boundary, rather than distance from the drawing region center. Many other variations will be apparent. In general, it can be said that boundary movement is triggered if the activity is located within a "predetermined" distance from the boundary. In a simplified embodiment, the predetermined distance can be set as half the width of the drawing region. In such an embodiment the drawing region will move in response to any activity not in the exact center of the drawing region, and assuming inertial effects are not used, will move so as to always maintain the stylus in the center of the drawing region.

In a different embodiment, the predetermined distance is some distance smaller than half the width of the drawing region. This enables the user to draw within some non-zero central part of the drawing region without being distracted by constant movement of the drawing region boundaries. In the embodiment of FIG. 8, the "predetermined distance from the boundary" is half the width of the drawing region less half of the dead zone width, the dead zone width remaining fixed even if the width of the drawing region varies.

Additionally, it can be seen that in the embodiment of FIG. 8, when one drawing region boundary moves due to activity tracking, the opposite boundary moves as well by the same distance (except in special circumstances involving adjacent drawing regions or wall edges). Thus the drawing region retains its width. In another embodiment, movement of a boundary due to activity tracking does not necessarily trigger movement of the opposite boundary; other rules may apply to the opposite boundary in such an embodiment. In one embodiment, only the one boundary which is being approached moves, thereby enlarging the drawing region.

Figure 9:
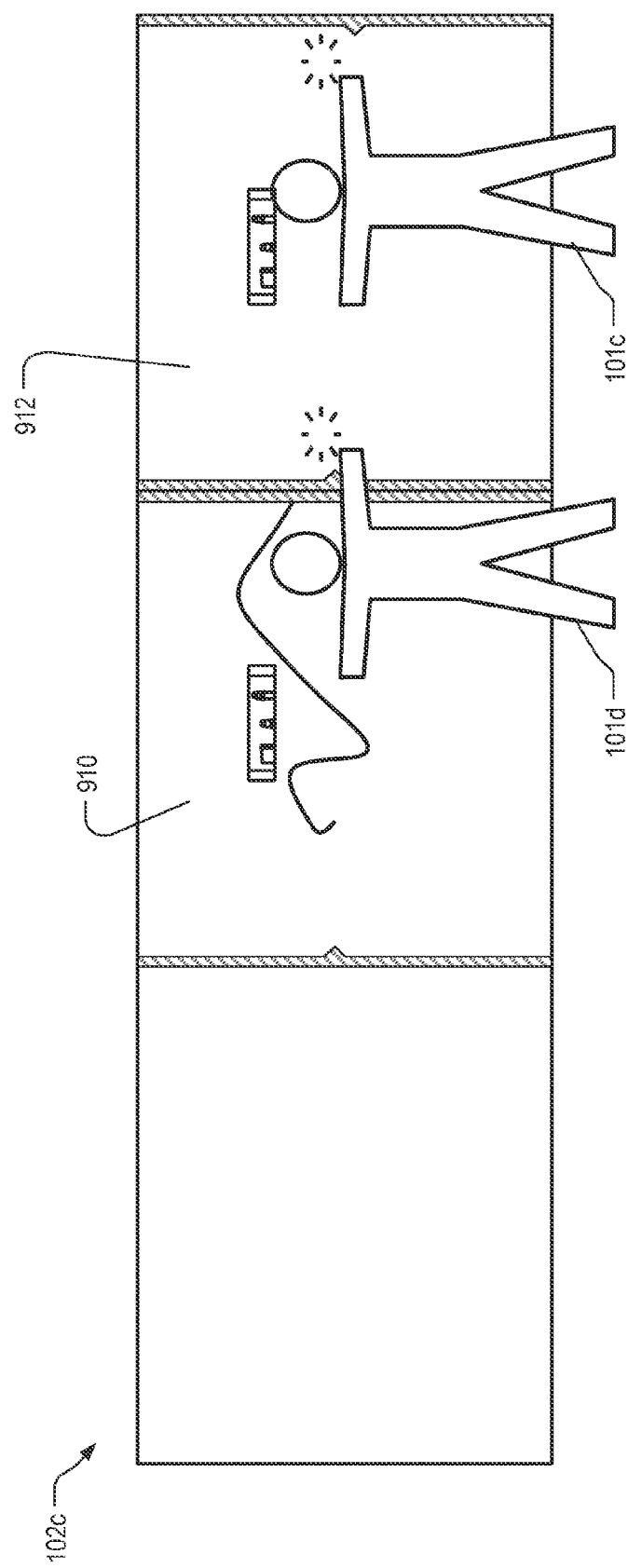

In the embodiment of FIGS. 8A and 8B, the region 810 is not permitted to track to a position at which it overlaps with another region. In FIG. 9, user 101d, using drawing region 910, drags the stylus toward the right. Region 910 tracks the stylus until the region meets another drawing region 912, at which point region 910 stops moving. User 101d continues to draw toward the right, first passing the edge of the dead zone so as to continue drawing between the dead zone and the right hand boundary of region 910.

Preferably, the system prevents a continuous line from being drawn beyond a region's boundary. As illustrated in FIG. 9, if the stylus moves past the drawing region boundary it ceases to draw outside the region. If user 101d were to lift the stylus and put it down again in the next region 912, however, then as previously described, the user can continue drawing. But the line properties of region 912 will be used rather than those of region 910. In essence the user has terminated the line draw at the drawing region 910 boundary, and started a new stroke in region 912 as if he or she were user 101c.

The region boundary behavior described above with respect to FIGS. 2-9 is effected by the computer system 110 in response to software modules stored accessibly thereto. The software modules cause the computer system 110 to operate in the manner described. The software modules also cause the computer system 110 to perform the steps indicated in FIG. 12 below as being performed by the computer system 110. While the present invention is described herein in the context of fully functioning computer systems, those of ordinary skill in the art will appreciate that the software modules used for controlling the computer systems to perform the functions said herein to be performed by computer systems, are capable of being stored or distributed in the form of a computer readable medium of instructions and data and that the invention applies equally regardless of the particular type of signal bearing media actually used to carry out the storage or distribution. As used herein, a computer readable medium is one on which information can be stored and read by a computer system. Examples include a floppy disk, a hard disk drive, a RAM, a CD, a DVD, flash memory, a USB drive, and so on. The computer readable medium may store information in coded formats that are decoded for actual use in a particular computer system. A single computer readable medium, as the term is used herein, may also include more than one physical item, such as a plurality of CD ROMs or a plurality of segments of RAM, or a combination of several different kinds of media. As used herein, the term does not include mere time varying signals in which the information is encoded in the way the signal varies over time.

Figure 13:
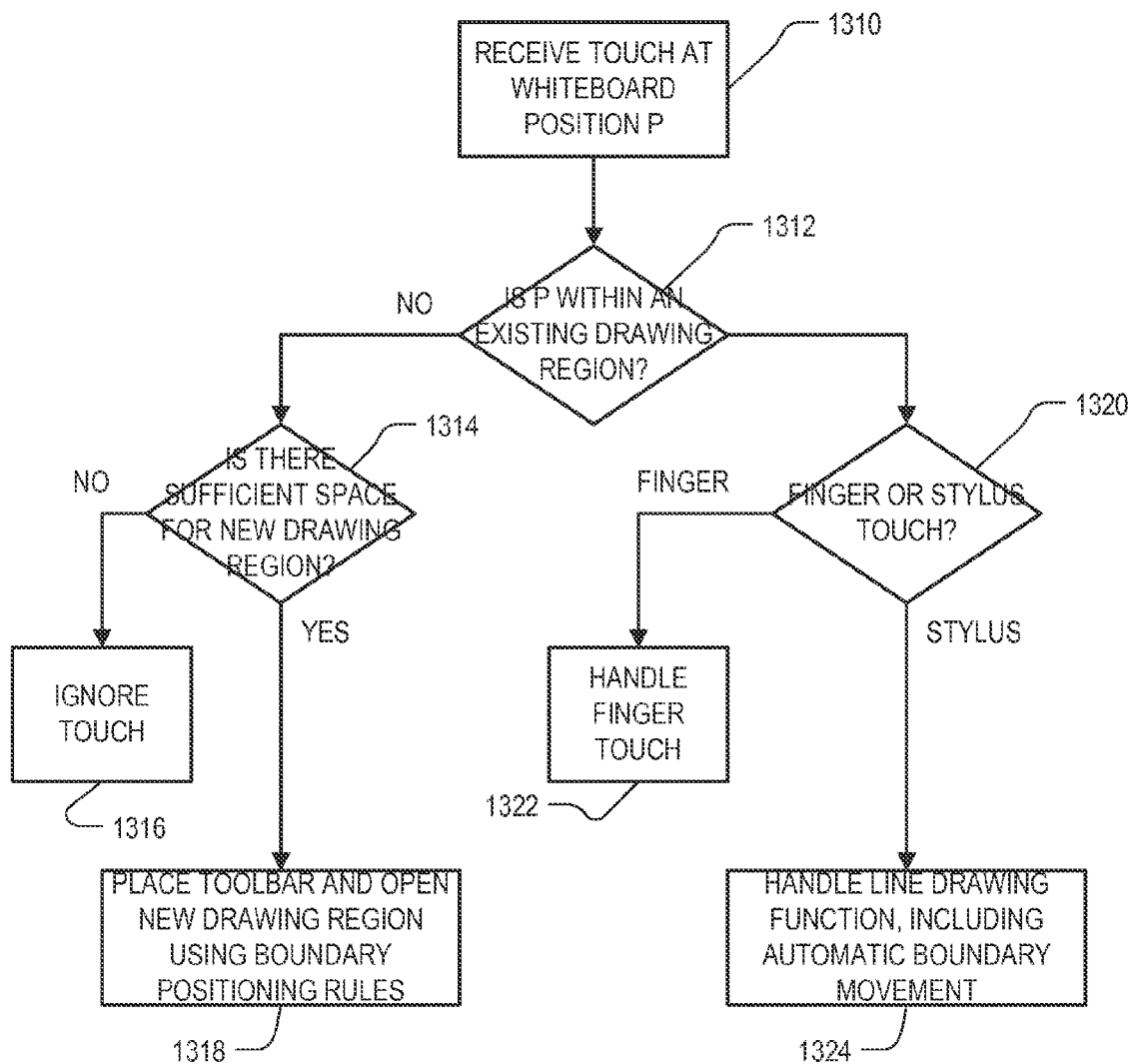
FIG. 13 is a flow chart illustrating the operation of computer system 110 to effect the region boundary behavior described with respect to FIGS. 2-9.

FIG. 13 is a flow chart illustrating the operation of computer system 110 to effect the region boundary behavior described above with respect to FIGS. 2-9, among other things. In step 1310, the computer system 110 detects a touch on the whiteboard 102c. In step 1312 it determines whether the touch is within an existing drawing region or on the background. The system can determine this in the embodiment of FIGS. 2-9 by comparing the horizontal position of the touch point with the horizontal positions of the boundaries of all the then-existing drawing regions. If the touch point is not within an existing drawing region, then in step 1314 the computer system 110 determines whether there is sufficient space surrounding the touch point for a new drawing region. This includes determining whether a minimum width region is available, and if not then whether an adjacent pre-existing region can be narrowed without violating the minimum width rule. If sufficient space is not available, then in step 1316 the touch is ignored. If step 1314 determines that sufficient space does exist for the new drawing region, then in step 1318 the computer system 110 places the toolbar near the touch point and opens the new drawing region using the boundary positioning rules as set forth above with respect to FIGS. 2-9.

If in step 1312 the computer system 110 determines that the touch point is within a drawing region, then in step 1320 the computer system 110 determines whether the writing implement that made the touch was a stylus or one or more fingers. If it was a finger touch, then in step 1322 the computer system 110 handles the finger touch. If it was a stylus, then in step 1324 the computer system 110 handles the line drawing function as described herein, including automatically moving a drawing region boundary if necessary as described above with respect to FIG. 8.

Figure 10:
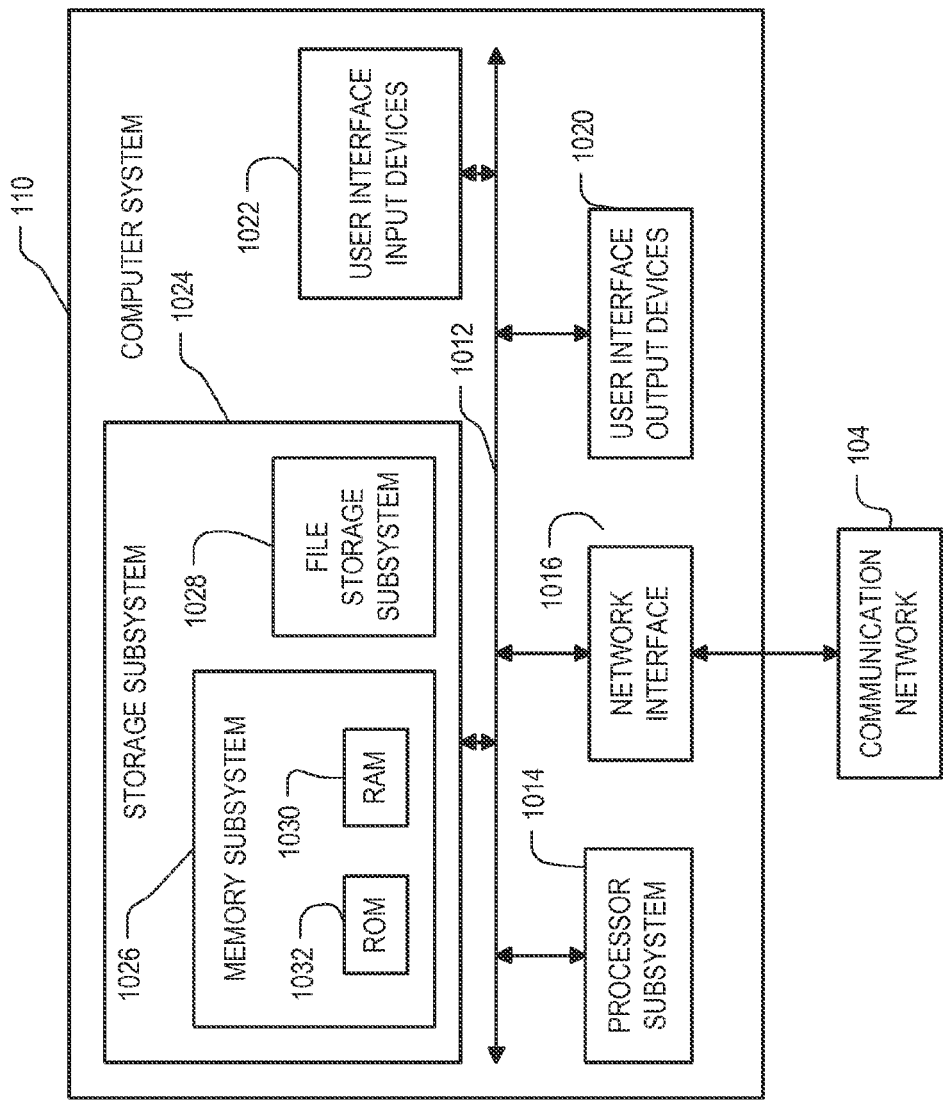
FIG. 10 is a simplified block diagram of the computer system 110 (FIG. 1B).

FIG. 10 is a simplified block diagram of a computer system 110. Computer system 110 typically includes a processor subsystem 1014 which communicates with a number of peripheral devices via bus subsystem 1012. These peripheral devices may include a storage subsystem 1024, comprising a memory subsystem 1026 and a file storage subsystem 1028, user interface input devices 1022, user interface output devices 1020, and a network interface subsystem 1016. The input and output devices allow user interaction with computer system 110. Network interface subsystem 1016 provides an interface to outside networks, including an interface to communication network 104, and is coupled via communication network 104 to corresponding interface devices in other computer systems. Communication network 104 may comprise many interconnected computer systems and communication links. These communication links may be wireline links, optical links, wireless links, or any other mechanisms for communication of information, but typically it is an IP-based communication network, at least at its extremities. While in one embodiment, communication network 104 is the Internet, in other embodiments, communication network 104 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1022 may include a keyboard, pointing devices such as a mouse, trackball, touchpad, or graphics tablet, a scanner, a touch screen incorporated into the display (including the touch sensitive portions of large format digital whiteboard 102*c*), audio input devices such as voice recognition systems, microphones, and other types of input devices. In general, use of the term "input device" is intended to include all possible types of devices and ways to input information into computer system 110 or onto computer network 104.

User interface output devices 1020 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. In the embodiment of FIG. 1B, it includes the display functions of large format digital whiteboard 102*c*. The display subsystem may also provide non visual display such as via audio output devices. In general, use of the term "output device" is intended to include all possible types of devices and ways to output information from computer system 110 to the user or to another machine or computer system.

Storage subsystem 1024 stores the basic programming and data constructs that provide the functionality of certain embodiments of the present invention. For example, the various modules implementing the functionality of certain embodiments of the invention may be stored in storage subsystem 1024. These software modules are generally executed by processor subsystem 1014.

Memory subsystem 1026 typically includes a number of memories including a main random access memory (RAM) 1030 for storage of instructions and data during program execution and a read only memory (ROM) 1032 in which fixed instructions are stored. File storage subsystem 1028 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 1028. The host memory 1026 contains, among other things, computer instructions which, when executed by the processor subsystem 1014, cause the computer system to operate or perform functions as described herein. As used herein, processes and software that are said to run in or on "the host" or "the computer", execute on the processor subsystem 1014 in response to computer instructions and data in the host memory subsystem 1026 including any other local or remote storage for such instructions and data.

Bus subsystem 1012 provides a mechanism for letting the various components and subsystems of computer system 110 communicate with each other as intended. Although bus subsystem 1012 is shown schematically as a single bus, alternative embodiments of the bus subsystem may use multiple busses.

Computer system 110 itself can be of varying types including a personal computer, a portable computer, a workstation, a computer terminal, a network computer, a television, a mainframe, a server farm, or any other data processing system or user device. In one embodiment, computer system 110 includes several computer systems, each controlling one of the tiles that make up the large format whiteboard 102*c*. (See the patent applications incorporated by reference.) Due to the ever changing nature of computers and networks, the description of computer system 110 depicted in FIG. 10 is intended only as a specific example for purposes of illustrating the preferred embodiments of the present invention. Many other configurations of computer system 110 are possible having more or less components than the computer system depicted in FIG. 10. The same components and variations can also make up each of the other devices 102 in the collaboration environment of FIG. 1, as well as the collaboration server 105 and whiteboard database 106. Another embodiment of a computer system that can be used to implement collaboration server 105 is set forth in the above-incorporated PCT International Application No. PCT/US12/39176.

Figure 11:
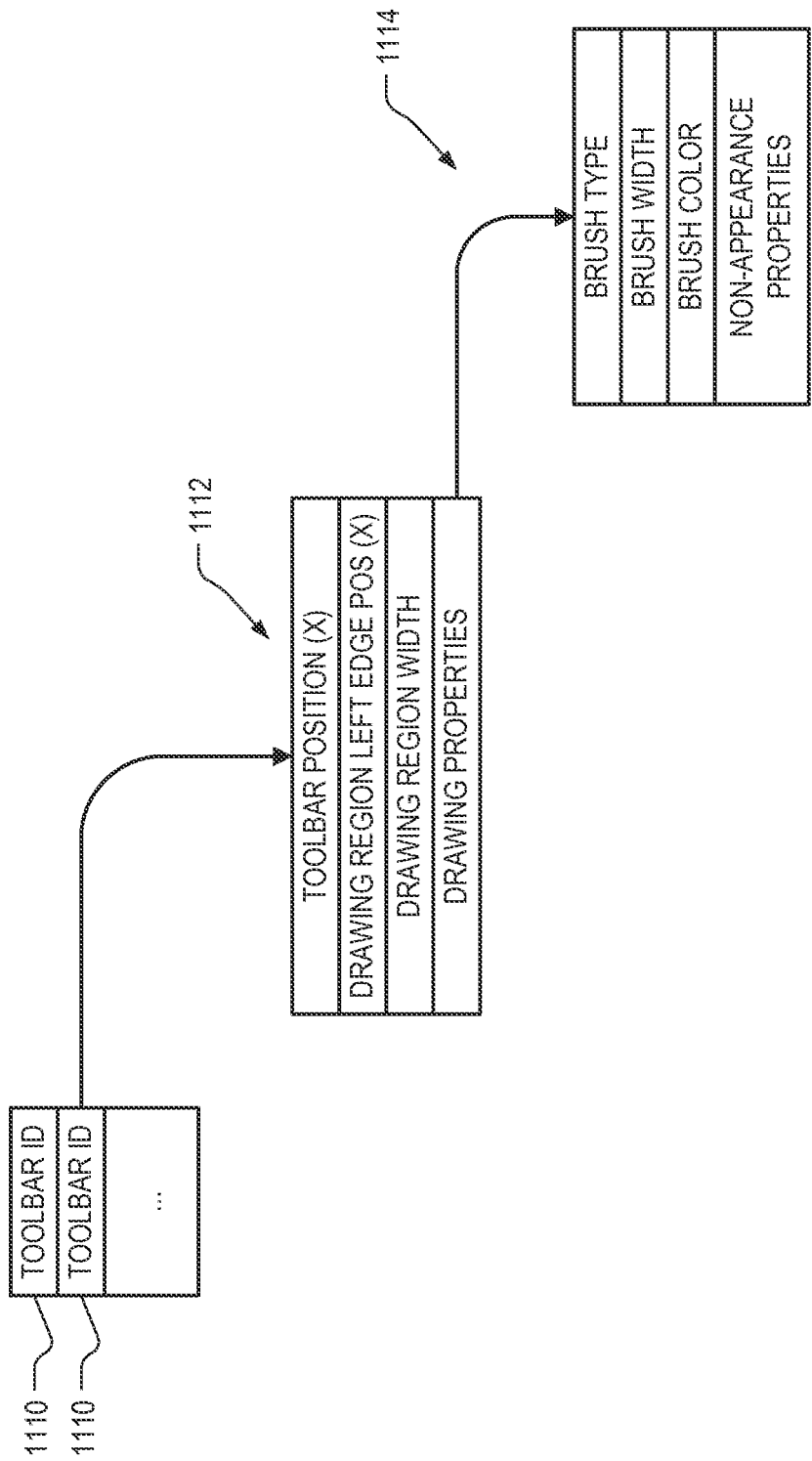
FIG. 11 is a schematic drawing of a database stored accessibly to the computer system 110 (FIG. 1B).

Certain information about the drawing regions active on the digital whiteboard 102*c* are stored in a database accessible to the computer system 110. The database can take on many forms in different embodiments, including but not limited to a MongoDB database, an XML database, a relational database, or an object oriented database. FIG. 11 is a schematic diagram illustrating certain information that the database contains, and certain relationships among the data.

In embodiments described herein, each drawing region is considered to be a child of a toolbar. The touching of a point on the wall background spawns a toolbar, which in turn spawns a drawing region (though the toolbar is not necessarily visible until the drawing region opens). Similarly, to close a drawing region, a user touches a 'close' icon on the drawing region's toolbar. Thus in FIG. 11, the database is headed by one or more toolbar ID's 1110. Each toolbar ID 1110 includes or points to a respective block 1112 of data, indicating the horizontal position of the toolbar, the horizontal position of the left edge of the toolbar's drawing region, with width of the drawing region, and a set of drawing properties for the drawing region. It will be appreciated that many variations are possible, such as specifying the right edge position of the drawing region rather than the left, and specifying the opposite edge position rather than the drawing region width. The toolbar position has only a horizontal value, because in an embodiment, it always remains at the same vertical position. In another embodiment both horizontal and vertical positions may be specified.

The drawing properties include or point to an array 114 of drawing attributes, each in association with one or more values. The drawing properties in FIG. 11 include a brush type, the value of which may for example indicate "paint", "ink", "crayon", "marker" or "eraser", each of which has a different character of appearance when drawn on the whiteboard 102c. The drawing properties in FIG. 11 also include a brush width, which can take on any value in a range of available values. The drawing properties in FIG. 11 also include a brush color, which has three associated values: red, green and blue content. As used herein, the three attributes brush type, brush width and brush color are considered to constitute "line appearance properties". Drawing properties 114 may in various embodiments also include other attributes, such as those that affect its location of the line or the location of part of the line. These properties may include such attributes as corner-rounding radius, or Bézier curve parameters. As can be seen in FIG. 11, there is no requirement that the drawing properties (including the line appearance properties) for different drawing regions be the same. They can be established independently of each other, so there is no need that they be identical. In a typical case they will not be identical.

In order to draw a line on the whiteboard 102c, a user provides "drawing user input" which indicates the drawing of the line. While other embodiments may allow a user to draw with a finger, in the embodiment of FIG. 1, only a stylus can be used to indicate the drawing of a line. Intuitively, the user so indicates by touching the stylus to the whiteboard 102c surface, within a drawing region, and dragging the stylus along the positions desired for the line. The end of a line drawing operation is indicated by lifting the stylus from the whiteboard 102c surface. The local computer system 110 determines from the user input where the points on the line are to be positioned, and displays them on the whiteboard 102c. The computer system 110 also transmits the stroke information to the collaboration server 105 (FIG. 1B), which writes them into its whiteboard database 106 and transmits them back to the various devices 102 sharing the session. Each of the devices 102 can then display the line (so long as the line intersects the device's viewport), so all such devices 102 will show the line at roughly the same time.

FIG. 12 (consisting of FIGS. 12A, 12B, 12C and 12D) is a flow chart illustrating a typical flow in which two users 101c and 101d are working at the whiteboard 102c. For simplicity of illustration, the circumstances of FIG. 5 will be assumed. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

Initially, in step 1210, it is assumed that no drawing regions are open. In step 1212, user 101c provides "opening user input" by touching the background. In step 1214, computer system 110 establishes initial values (which may be defaults) for the attributes in block 1112 (FIG. 11) for a new drawing region 512, and in step 1216 it visibly opens the drawing region on the whiteboard 102c and displays toolbar 510. The drawing region 512 is smaller than the full area of the whiteboard 102c. The flow for user 101c continues at the designation "B" in FIG. 12B.

Either before, after or concurrently with steps 1212, 1214 and 1216, in step 1218 the second user 101d provides "opening user input" by touching the background. In step 1220 computer system 110 establishes initial values for the attributes in block 1112 for a new drawing region 514, and in step 1222 the computer system visibly opens drawing region 514 on the whiteboard 102c and shows the toolbar 520. The two drawing regions 512 and 514 are distinct from each other (they do not overlap), and their line appearance properties are independent of each other.

In addition, in step 1224, user 101d provides user input indicating a change in the line appearance properties for lines drawn in drawing region 514, such as brush type, width and color, by touching appropriate icons in toolbar 520. In step 1226 the computer system 110 establishes the new the desired values for the drawing region 514 by recording them in the block 1114 for drawing region 514. At this point the appearance properties in effect for drawing region 514 are no longer identical to those in effect for drawing region 512. The flow for user 101d continues at the designation "C" in FIG. 12C.

Up to this point, all activity is local and no drawing-related messages have been transmitted to collaboration server 105.

Figure 12A:
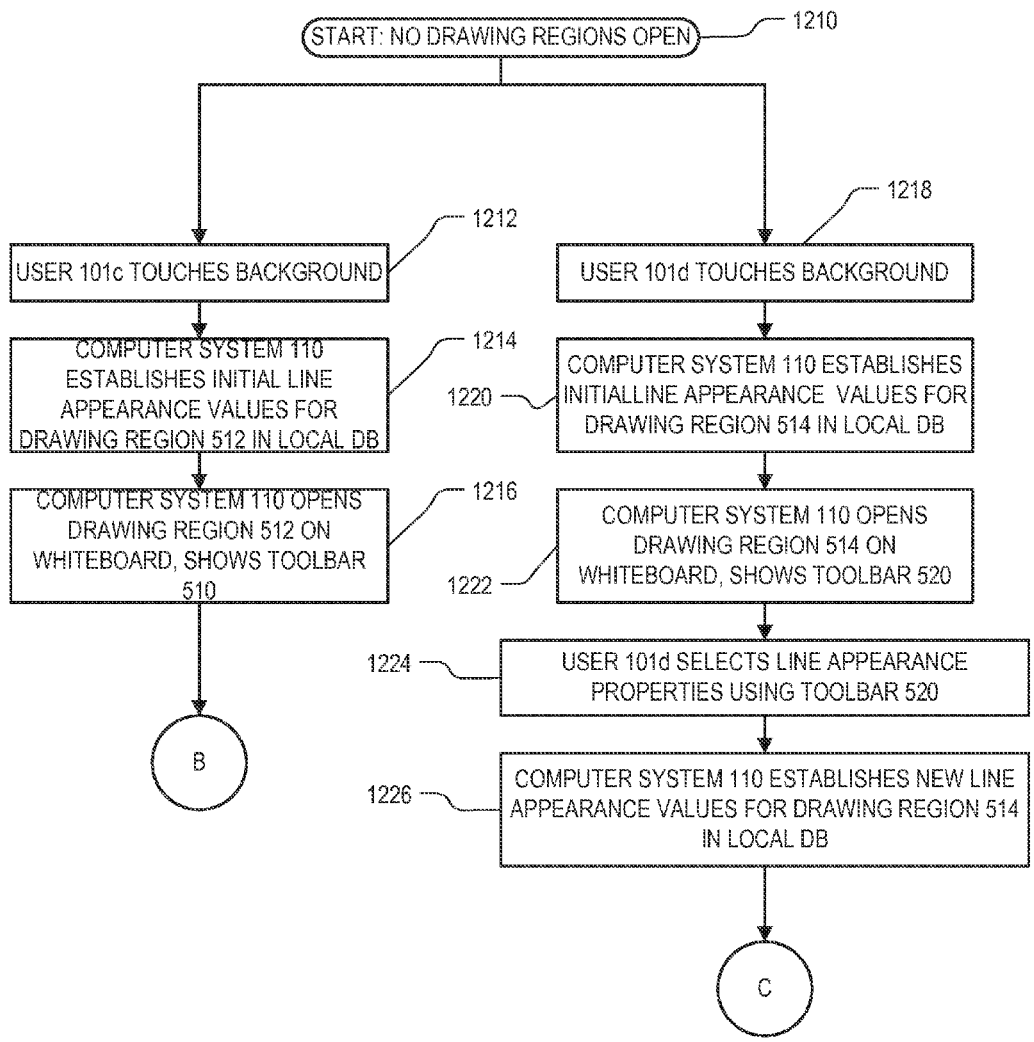
FIG. 12 (consisting of FIGS. 12A, 12B, 12C and 12D) is a flow chart illustrating a typical flow in which two users are working at the whiteboard of FIG. 1.
Figure 12B:
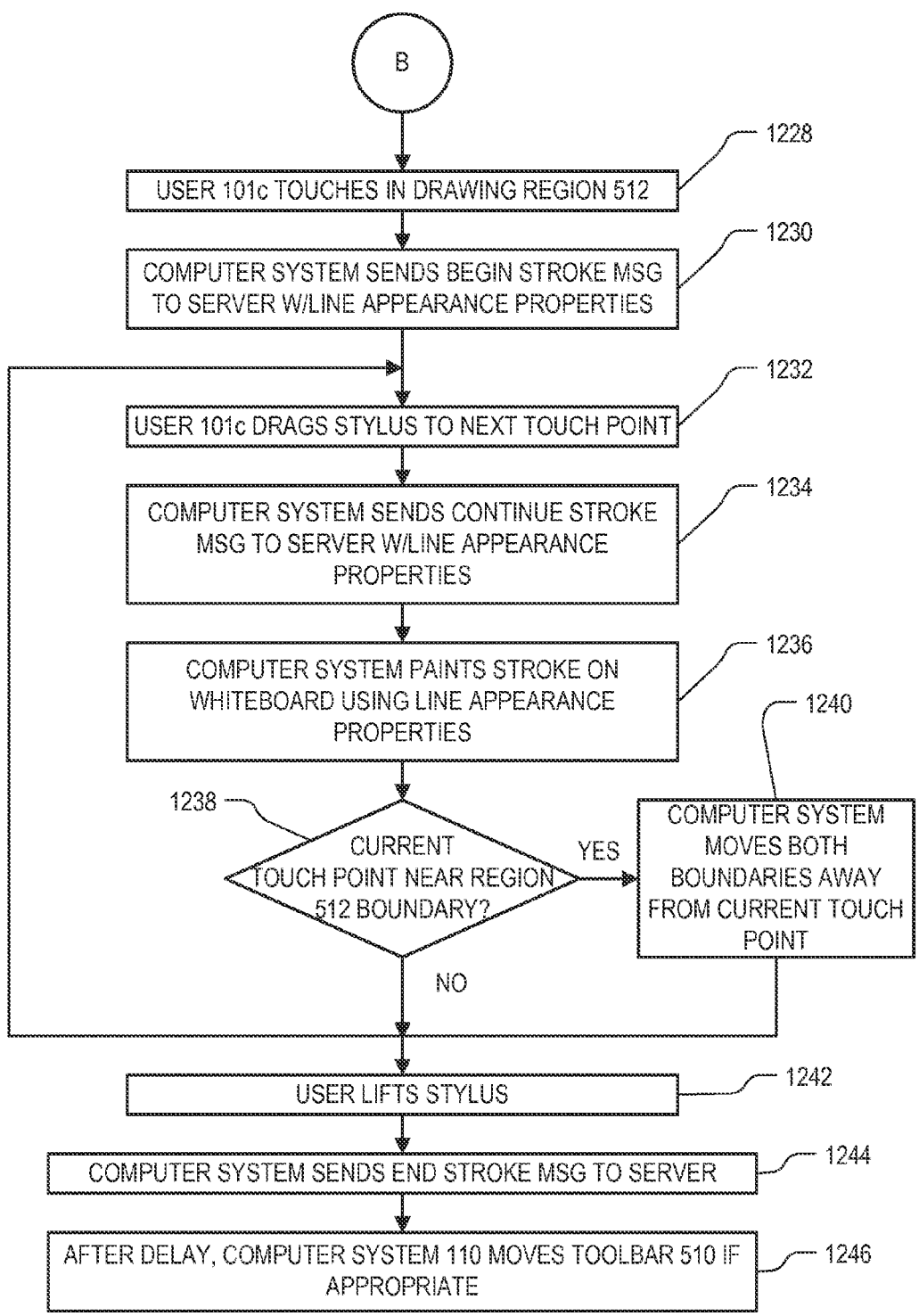

Referring to FIG. 12B, in step 1228 the user 101c provides user input indicating drawing of a line within drawing region 512. Whereas other embodiments may follow a different strategy, in the embodiment of FIG. 1, lines are indicated by a starting position followed by the sequence of points through which the user's stylus passes. The touching of the stylus to the whiteboard 102c surface indicates the starting point of the line. In step 1230 the computer system 110 sends a Begin Stroke message to the server 105. This message contains the (X,Y) position of the starting point of the line, as well as the line drawing properties then in effect for drawing region 512. The (X,Y) position of the stylus as detected on the whiteboard 102c is represented in a local coordinate system specific to the whiteboard, which in turn reflects only a viewport into the more universal coordinate system with which positions are represented by the collaboration server 105. Thus computer system 110 translates the position of the stylus from the local coordinate system to the universal coordinate system before transmitting any message to the server 105.

In step 1232 the user 101c drags or swipes the stylus to the next touch point, and in step 1234 the computer system 110 sends a Continue Stroke message to the server 105. The Continue Stroke message identifies the new touch point position (X,Y), as well as the line drawing properties then in effect for drawing region 512. Again, the computer system 110 translates coordinate systems before transmitting the Continue Stroke message.

In step 1236 the computer system 110 paints the stroke on the whiteboard 105c roughly or exactly from the prior stylus position to the current stylus position, using the line appearance properties then in effect for the drawing region 512. In another embodiment, the whiteboard 105c does not paint the stroke from the touch input data, but rather awaits a broadcast of the stroke information from the server and paints it in response to the broadcast stroke information.

In step 1238, the computer system 110 determines whether the current touch point is within a predetermined distance from a boundary of region 512. (Refer to the discussion accompanying FIG. 8.) If it is not, then the process loops back to step 1232 where the user 101c drags the stylus on to the next touch point. This loop repeats many times as the user touches points on the whiteboard 105c in sequence, to indicate the drawing of a line. As the user does so, the system 110 displays the line on the whiteboard 105c with the appearance properties then in effect for the drawing region 512.

If in step 1238 it is determined that the current touch point is within the predetermined distance from a boundary of region 512, then as described above with respect to FIG. 8, the computer system 110 moves the near boundary in a direction away from the current touch point (step 1240). It also moves the opposite boundary of region 512 in the same direction, such that the width of region 512 remains constant. The process then returns to step 1232 to continue the line drawing loop.

At some point the user lifts the stylus to indicate termination of the line (step 1242). In response to this user behavior, in step 1244 the computer system 110 transmits an End Stroke message to the server 110. After a short delay, as described below, the computer system 110 may also at this time move the toolbar 510 closer to the endpoint of the line (step 1246).

Figure 12C:
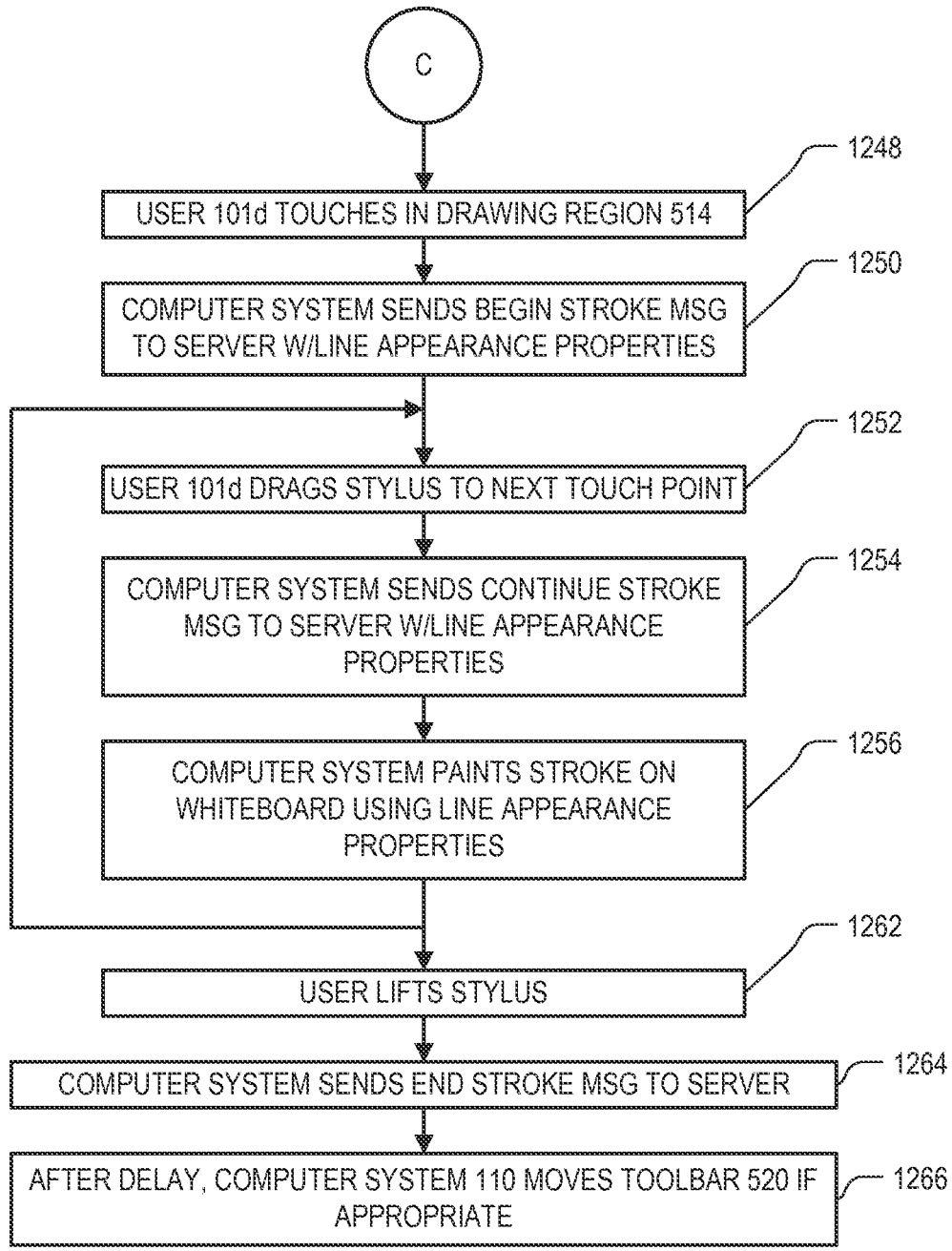

The user 101d's process after step 1226 (FIG. 12A) is similar to that of user 101c's process just described. Referring to FIG. 12C, in step 1248 the user 101c provides user input indicating drawing of a line within drawing region 514. The touching of the stylus to the whiteboard 102c surface indicates the starting point of the line. In step 1250 the computer system 110 sends a Begin Stroke message to the server 105, containing the (X,Y) position of the starting point of the line in universal coordinates, as well as the line drawing properties then in effect for drawing region 512. In step 1252 the user 101c drags the stylus to the next touch point, and in step 1254 the computer system 110 sends a Continue Stroke message to the server 105. The Continue Stroke message identifies the new touch point position (X,Y), as well as the line drawing properties then in effect for drawing region 514.

In step 1256 the computer system 110 paints the stroke on the whiteboard 105c roughly or exactly from the prior stylus position to the current stylus position, using the line appearance properties then in effect for the drawing region 514, which as mentioned, are different from those then in effect for drawing region 512. The process then loops back to step 1252 where the user 101d drags the stylus on to the next touch point. This loop repeats many times as the user touches points on the whiteboard 105c in sequence, to indicate the drawing of a line. As the user does so, the system 110 displays the line on the whiteboard 105c with the appearance properties then in effect for the drawing region 514.

At some point the user 101d lifts the stylus to indicate termination of the line (step 1262). In response to this user behavior, in step 1264 the computer system 110 transmits an End Stroke message to the server 110. After a short delay, as described below, the computer system 110 may also at this time move the toolbar 520 closer to the endpoint of the line (step 1266).

Figure 12D:
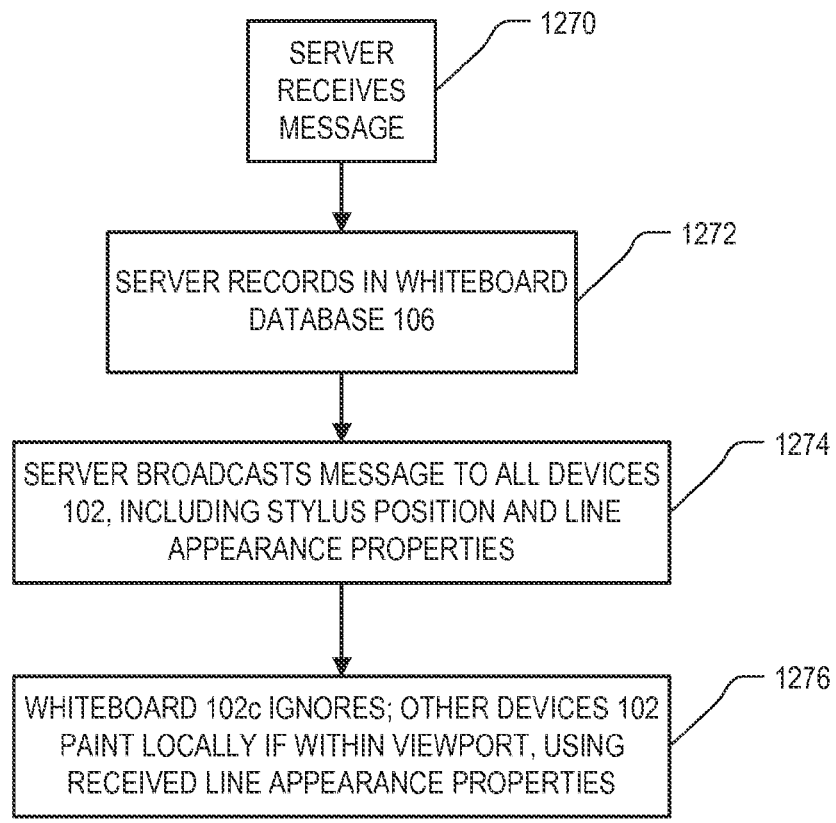

FIG. 12D illustrates the process that takes place in collaboration server 105 upon receipt of the Begin Stroke, Continue Stroke, and End Stroke messages. In step 1270, the server receives the message. In step 1272, it records the content of the message in the whiteboard database 106. In step 1274, the server broadcasts the message to all devices 102 that are sharing the session with whiteboard 102c. The broadcast message includes a position in universal coordinates, as well as the line appearance properties that it received in step 1270. Whiteboard 102c ignores the broadcast message, since it has already painted the appropriate points on its local display as described with respect to steps 1236 and 1256. But in step 1276, all of the other devices 102 that receive the broadcast message determine whether the indicated point is within the viewport of the local device, and if so they convert the point to the local device coordinate system and display it on the local display using the received line appearance properties. Those of the other devices which are small, such as PC's and tablets, might have only a single drawing region. An independent set of appearance properties are associated with such drawing regions, but they are ignored when painting the line as received in the broadcast messages from step 1274. The collaboration environment of FIG. 1 also supports additional large format whiteboards which can have their own multiple drawing regions defined as does whiteboard 102c, but again, the local drawing regions and the line appearance properties then in effect for such drawing regions are ignored when painting the line as received in the broadcast messages from step 1274. The drawing region boundaries on these other whiteboards are ignored as well, and the line being painted can even traverse multiple drawing regions.

If a user of one of the other devices 102 begins drawing on the local device, the same sequence of messages are sent to the server and rebroadcast to all the other devices (including whiteboard 102c) as described above with respect to FIG. 12. These lines, however, are drawn using the line appearance properties then in effect in the drawing region on which the user is swiping the stylus. Thus, for example, two different users may be operating two different devices 102. The first user may have set the line color for his or her drawing region to red, whereas the second user may have set the line color for his or her drawing region to blue. The lines drawn by the first user will then be displayed in red on both devices, and the lines drawn by the second user will then be displayed in blue on both devices. Both lines can appear simultaneously on both devices, and for example they can even intersect each other.

Toolbar Behavior

As mentioned, in the embodiment of FIG. 1, each drawing region has an associated toolbar. The toolbar controls a variety of functions in various embodiments, but at a minimum it provides a way for a user to set one or more line appearance properties for the drawing region. Toolbars in the embodiment of FIG. 1 are local features; they are spawned, moved and closed entirely by the computer system 110, and neither their presence nor their motion is sent to the collaboration server 105. In other embodiments the collaboration server 105 can be involved in various aspects of the toolbar.

In the embodiment of FIG. 1, the computer system 110 positions the toolbar close enough to the user's activity, but does so with minimum distraction. In particular, if the user's activity (such as drawing a line) has not moved too far away from the current toolbar position, then the toolbar remains where it is. Only when the user's activity has become farther than a predetermined distance from the toolbar, will the system 110 move the toolbar closer. In addition, distraction is minimized also by always keeping the toolbar at a constant vertical position, and always moving the toolbar horizontally. Distance in this embodiment is measured horizontally only.

Thus in the embodiment of FIG. 1, when the user first touches a position on the whiteboard 102c to open a drawing window, the computer system 110 first displays the toolbar at a position which depends on the first touch position. Specifically, it is displayed at the predetermined vertical position, and at a horizontal position that is close to the first touch position, but not so close that it overlaps the first touch position. In an embodiment, the toolbar always appears directly above the touch position.

As the user draws on the whiteboard, the computer system 110 determines the position of the user's activity. The distance (in the horizontal dimension) between the user's activity and the current toolbar position is then compared to a predefined maximum toolbar distance. If the position of the user's activity remains closer to the current toolbar position than the predetermined distance, then the toolbar does not move. Only if the position of the user's activity becomes more than the predetermined distance from the current toolbar position, does the computer system 110 move the toolbar to a new toolbar position which is closer to the user's most recent activity (though again, not so close that it overlaps the user's most recent activity).

Preferably the computer system 110 does not move the toolbar during the process of a line draw, but rather waits until the stylus is lifted from the whiteboard surface. In an embodiment, the system waits for a further few seconds of inactivity time in order to ensure the user is truly finished. If the distance at that time exceeds the predetermined distance then the toolbar is moved.

In another embodiment, the distance measured against the predetermined maximum toolbar distance is the Euclidean distance, rather than solely the horizontal distance. Such an embodiment might be most useful where the toolbar is allowed to move vertically as well as horizontally.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Also as used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, though the whiteboards described herein are of large format, small format whiteboards can also be arranged to use multiple drawing regions, though multiple drawing regions are more useful for whiteboards that are at least as large as 12' in width. In particular, and without limitation, any and all variations described, suggested by the Background section of this patent application or by the material incorporated by references are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for operating a digital whiteboard having an area, comprising the steps of:
   in response to first opening user input, opening a first drawing region on the whiteboard, the first drawing region having an area smaller than the full digital whiteboard area and further having a first boundary;
   establishing a first set of line appearance properties, including two or more of brush type, brush size, and color, in effect for the first drawing region;
   in response to second opening user input, opening a second drawing region on the whiteboard distinct from the first drawing region;
   establishing a second set of line appearance properties, including two or more of brush type, brush size, and color, in effect for the second drawing region, the second set of line appearance properties being non-identical to the set of line appearance properties then in effect for the first drawing region;

in response to first drawing user input indicating drawing of a first line within the first drawing region, displaying the first line on the whiteboard with an appearance that depends on the set of line appearance properties then in effect for the first drawing region;

moving the first boundary in response to the first drawing user input; and in response to second drawing user input indicating drawing of a second line within the second drawing region, displaying the second line on the whiteboard with an appearance that depends on the set of line appearance properties then in effect for the second drawing region wherein the step of moving the first boundary in response to the first drawing user input comprises a step of, in response to the first drawing user input reaching a first position that is within a predetermined distance from the first boundary of the first drawing region, moving the first boundary of the first drawing region in a direction away from the first position.

2. The method of claim 1, wherein the first opening user input comprises a user touching the digital whiteboard at a touch point not within any pre-existing drawing regions.

3. The method of claim 1, wherein the step of establishing a first set of line appearance properties in effect for the first drawing region comprises a step of establishing default line appearance properties as being effective for the first drawing region.

4. The method of claim 1, wherein the second opening user input comprises touching the digital whiteboard at a touch point not within any pre-existing drawing regions.

5. The method of claim 1, wherein the first and second sets of line appearance properties each include a respective value for a particular drawing attribute, and wherein the step of establishing a second set of line appearance properties in effect for the second drawing region comprises the step of establishing the second set of line appearance properties in response to user input indicating a particular value for at least the particular attribute of the second set of line appearance properties, the particular value being different from the value for the particular attribute in the first set of line appearance properties.

6. The method of claim 1, wherein the first drawing region has a variable width, and wherein the predetermined distance is half the width of the first drawing region less half of a dead zone width, the dead zone width remaining fixed as the width of the first drawing region varies.

7. The method of claim 1, wherein the first boundary is oriented vertically on the whiteboard, and wherein the direction away from the first position is horizontal.

8. The method of claim 1, wherein the first drawing region further has a second boundary opposite the first boundary, further comprising a step of, in response to the first drawing user input reaching the first position, moving the second boundary of the first drawing region in a direction toward the first position.

9. The method of claim 1, wherein the first drawing region further has a second boundary opposite the first boundary, further comprising a step of, in response to the first drawing user input reaching the first position, moving the second boundary of the first drawing region so as to maintain a constant width of the first drawing region during the step of moving the first boundary.

10. The method of claim 1, wherein the first opening user input comprises a user indicating a first touch point on the whiteboard which is not within any pre-existing drawing regions, and wherein the step of opening a first drawing region comprises a step of opening the first drawing region such that it is centered horizontally at the first touch point and has a width equal to a predetermined default width.

11. The method of claim 1, wherein the second opening user input comprises a user indicating a second touch point on the whiteboard which is not within any pre-existing drawing regions, but is less than half of a predetermined drawing region minimum width horizontally from an edge of the whiteboard, and wherein the step of opening a first drawing region comprises a step of opening the first drawing region such that it abuts the edge of the whiteboard and has a width equal to the predetermined minimum width.

12. The method of claim 1, wherein the second opening user input comprises a user indicating a second touch point on the whiteboard which is not within any pre-existing drawing regions, and is located at a distance D horizontally from an edge of the whiteboard, where Wideal/2<D< (Wideal/2+Wmin), Wideal being a predetermined ideal drawing region width and Wmin being a predetermined minimum drawing region width, and wherein the step of opening a second drawing region comprises a step of opening the second drawing region such that it abuts the edge of the whiteboard and extends horizontally away from the edge by half the ideal width beyond the second touch point.

13. The method of claim 1, wherein the second opening user input comprises a user indicating a second touch point on the whiteboard which is not within any pre-existing drawing regions, and is located at a distance D horizontally from a boundary of the first drawing region, where Wideal/2<D<(Wideal/2+Wmin), Wideal being a predetermined ideal drawing region width and Wmin being a predetermined minimum drawing region width, and wherein the step of opening a second drawing region comprises steps of:

opening the second drawing region such that it extends horizontally away from the first drawing region by a distance Wideal/2 beyond the second touch point, and extends horizontally toward the first drawing region by a distance which is greater than Wideal/2 from the second touch point but less than distance D from the second touch point; and enlarging the first drawing region such that it abuts the second drawing region horizontally.

14. A digital whiteboard system comprising:

a digital whiteboard having an area;

a memory; and a data processor coupled to the memory, the data processor configured to:

in response to first opening user input, open a first drawing region on the whiteboard, the first drawing region having an area smaller than the full digital whiteboard area and further having a first boundary;

establish a first set of line appearance properties, including two or more of brush type, brush size, and color, in effect for the first drawing region;

in response to second opening user input, open a second drawing region on the whiteboard distinct from the first drawing region;

establish a second set of line appearance properties, including two or more of brush type, brush size, and color, in effect for the second drawing region, the second set of line appearance properties being non-identical to the set of line appearance properties then in effect for the first drawing region;

in response to first drawing user input indicating drawing of a first line within the first drawing region, display the first line on the whiteboard with an appearance that depends on the set of line appearance properties then in effect for the first drawing region;

move the first boundary in response to the first drawing user input reaching a first position that is within a predetermined distance from the first boundary of the first drawing region, moving the first boundary of the first drawing region in a direction away from the first position; and in response to second drawing user input indicating drawing of a second line within the second drawing region, display the second line on the whiteboard with an appearance that depends on the set of line appearance properties then in effect for the second drawing region.

15. A digital whiteboard system comprising:

a wall surface having first and second distinct drawing regions; and a computer system having a database accessible thereto, wherein the database has first storage for storing an identification of first line appearance properties associated with the first drawing region, and second storage for storing an identification of second line appearance properties associated with the second drawing region wherein the first line appearance properties and the second line appearance properties each include two or more of brush type, brush size, and color.

16. A system according to claim 15, wherein the first storage identifies first line appearance properties associated with the first drawing region, and second line appearance properties associated with the second drawing region, and the first and second line appearance properties are non-identical.

17. A method for operating a digital whiteboard having an area, comprising the steps of:

in response to first opening user input, opening a first drawing region on the whiteboard at a first location, wherein at the first location the first drawing region includes a first portion and a second portion of the whiteboard, the first drawing region having an area smaller than the full digital whiteboard area;

establishing a first set of line appearance properties, including two or more of brush type, brush size, and color, in effect for the first drawing region;

in response to second opening user input, opening a second drawing region on the whiteboard distinct from the first drawing region;

establishing a second set of line appearance properties, including one or more of brush type, brush size, and color, in effect for the second drawing region, the second set of line appearance properties being non-identical to the set of line appearance properties then in effect for the first drawing region;

in response to first drawing user input indicating drawing of a first line within the first drawing region, displaying the first line on the whiteboard, the first line including sections in the first and second portions of the whiteboard, with an appearance that depends on the set of line appearance properties then in effect for the first drawing region;

moving the first drawing region in response to the first drawing user input to a second location, wherein at the second location the first drawing region includes a third portion of the whiteboard and does not include the first portion of the whiteboard; and in response to second drawing user input indicating drawing of a second line within the second drawing region, displaying the second line on the whiteboard with an appearance that depends on the set of line appearance properties then in effect for the second drawing region;

wherein the step of moving the first drawing region in response to the first drawing user input comprises a step of, in response to the first drawing user input reaching a first position that is within a predetermined distance from a first boundary of the first drawing region, moving the first boundary of the first drawing region in a direction away from the first position.

18. The method of claim 17, further comprising the steps of:

moving the second drawing region in response to the second drawing user input from a third position to a fourth position, wherein at the fourth position the second drawing region includes the first portion of the whiteboard.

19. The method of claim 18, wherein the second line includes a section in the first portion of the whiteboard.

\* \* \* \* \*